United States Patent [19]

Carter et al.

[11] Patent Number: 5,150,690
[45] Date of Patent: Sep. 29, 1992

[54] FLOW CONTROL SYSTEM

[75] Inventors: Stephen A. Carter, Mississauga; Bryan C. Williamson, Burlington; Karl H. Kozole, Weston, all of Canada

[73] Assignee: Ortech Corporation, Ontario, Canada

[21] Appl. No.: 512,300

[22] Filed: Apr. 20, 1990

[30] Foreign Application Priority Data

Sep. 29, 1989 [CA] Canada .................... 614540

[51] Int. Cl.⁵ ............................... F02B 43/00
[52] U.S. Cl. .................... 123/527; 137/599; 123/478
[58] Field of Search ............... 123/510, 511, 512, 527, 123/543, 430, 478; 137/486, 487.5, 599, 601; 251/129.01

[56] References Cited

U.S. PATENT DOCUMENTS

| Re. 29,383 | 9/1977 | Gallatin et al. | 137/487.5 |
|---|---|---|---|
| 2,381,304 | 8/1945 | Merrill | 123/527 |
| 3,669,081 | 6/1972 | Monpetit | 123/478 |
| 3,726,296 | 4/1973 | Friedland et al. | 137/599 |
| 3,746,041 | 7/1973 | Friedland | 137/599 |
| 3,785,389 | 1/1974 | Friedland et al. | 137/599 |
| 3,875,964 | 4/1975 | Friedland | 137/599 |
| 3,933,135 | 1/1976 | Zillman et al. | 123/478 |
| 3,937,248 | 2/1976 | Hutton | 137/487.5 |
| 3,942,553 | 3/1976 | Gallatin | 137/599 |
| 4,140,088 | 2/1979 | de Vulpillieres | 123/478 |
| 4,148,340 | 4/1979 | Hutton | 137/599 |
| 4,366,541 | 12/1982 | Mouri et al. | 123/480 |
| 4,433,664 | 2/1984 | Rodriques | 123/527 |
| 4,449,509 | 5/1984 | Young | 137/527 |
| 4,487,187 | 12/1984 | Petro | 123/478 |
| 4,545,345 | 10/1985 | Pagdin et al. | 123/527 |
| 4,641,625 | 3/1987 | Smith | 123/527 |
| 4,765,303 | 8/1988 | Jones | 123/527 |
| 4,829,957 | 5/1989 | Garretson et al. | 123/527 |
| 4,925,156 | 5/1990 | Stoll et al. | 251/129.01 |

FOREIGN PATENT DOCUMENTS 815179 6/1969 Canada .
2751743 5/1979 Fed. Rep. of Germany ...... 137/599

OTHER PUBLICATIONS

The Digital Valve Company catalogue, pp. 1–8, general specifications–Digicon/Digicell–Model RC.
Catalogue, The Digital Valve Company, Introducing the Digicon & Digicell Valves, Meters and Provers.

Primary Examiner—Noah P. Kamen
Attorney, Agent, or Firm—Shoemaker and Mattare Ltd.

[57] ABSTRACT

A flow control system for use in a compressible fluid-fueled internal combustion engine includes a fluid metering device comprising a plurality of fluid lines for communication between an inlet fluid manifold and a metered fluid manifold. Bistable valves of various orifice sizes are provided, one in each of the fluid lines except for at least two lines, which are provided with pulsing valves. The device also includes sensors for determining parameters of the inlet fluid sufficient to determine potential mass flow of fluid through each of the valves, and valve controls for activating valve actuators to open the valves in combinations and for time intervals to give a desired total mass flow of fluid through the valves. The total fluid flow passing from the metering device comprises a base flow component established by opening selected bi-stable control valves to provide a continuous predetermined flow, discrete step changes in the base flow component being provided by opening and closing combinations of bi-stable control valves. Increments of fluid flow between the discrete steps are provided by opening at least one pulsing valve for a fraction of a predetermined time period to provide a desired average flow over the time period.

24 Claims, 12 Drawing Sheets

FLOW CONTROL SYSTEM

FIELD OF THE INVENTION

This invention relates to the control of the flow rate of a fluid, and in particular to the control of the supply of compressible fluid fuels for internal combustion engines.

BACKGROUND OF THE INVENTION

Systems for converting conventional gasoline and diesel fuelled internal combustion engines to run on compressible fluid fuels, such as natural gas and propane, have been available for some time. Under current fiscal policy, there is generally a considerable retail price advantage to using propane or natural gas as a fuel, such that, for example, taxi operators and police forces can rapidly recoup the extra cost of providing a vehicle with the capability to run on propane or natural gas. Even without advantageous tax structuring the cost of a natural gas is generally lower than that of gasoline and diesel fuels, natural gas requiring relatively minor processing before it is in a saleable form, whereas conventional liquid gasoline fuels are often produced by "cracking" and processing of other longer chain hydrocarbons. Also, spark ignition engines running on natural gas do not suffer from compression ignition or "knocking" (except at very high compression ratios and intake air temperatures on large bore engines), and thus, the need for the provision of natural gas with different characteristics, similar to octane rated gasoline, is obviated. This also removes the requirement to provide knock resisting additives, such as the lead based additives used in some gasoline. Further, the major component of natural gas is methane, a "clean" fuel, which produces substantially less carbon dioxide on burning than does conventional gasoline or diesel fuel.

Despite these advantages the use of natural gas has only met with limited acceptance. This may be linked, in part at least, to a number of areas where natural gas powered vehicles compare unfavourably with conventional gasoline fuelled vehicles. The technology for utilizing natural gas fuel in this area is not as well developed as that used in conventional gasoline fueling systems and existing products are generally relatively expensive to produce, install and service. Also, the conversion of a gasoline engine to run on natural gas normally results in a decrease in power output and a corresponding drop in vehicle performance.

A typical gaseous fuel injection system includes a pressurized fuel storage tank, a pressure regulator for reducing the fuel from the relatively high storage pressure to a lower working pressure, a metering valve for controlling the gas supply to the engine and a gas/air mixer at the engine air intake. Some form of engine management system is also provided to control the metering valve and ensure proper engine operation.

Pressure regulators in existing gaseous fuel injection systems tend to be bulky and thus are difficult to locate in the often restricted space of a vehicle engine compartment. Accordingly, these are often only suitable for use on engines with spacious engine compartments. The bulk of existing regulators is due, in part at least, to the number of components which are present in a regulator: a fuel filter between the fuel line from the fuel storage tank; at least two regulating valve stages for reducing the pressure of the fuel as it passes through the regulator; a relief valve which opens in the event of a failure of the regulator valve to prevent high pressure fuel passing unchecked through the regulator, and a heater to warm the regulator and compensate for the cooling effect of expanding the fluid at the regulating valve.

Regulator fuel filters must be of rugged construction, since if they become blocked they may have to withstand high pressures (up to 4000 p.s.i. for natural gas), and a failure of the filter may result in considerable damage to the regulator and other components downstream of the valve.

Existing regulator valves permit relatively low flow rates, are prone to blocking and, in some cases, two or three stage regulators must be provided to accomplish a desired pressure drop and stability. Further, increasing the flow through the regulating valve tends to lead to pressure "droop", that is the pressure drop at the valve at high flow rates is proportionally greater than the pressure drop at lower flows, leading to difficulties in calibration.

Tests on relief valves provided in existing fuel injection systems indicate that the valves are not particularly reliable and often will not open at the intended pressure. Further, some doubt has been expressed as to the ability of existing valves to accommodate the flow rates experienced on failure of the regulator valve: if a relief valve on a regulator should fail, the regulator may be destroyed, in explosive fashion, by the build-up of internal fuel pressure.

Heating of regulators is normally accomplished using the engine cooling fluid, and is particularly important in natural gas fuelled vehicles, where the drop in pressure and temperature produced by the regulator valve may result in the appearance of hydrates, a lattice of methane and water present in the fuel, which has the appearance of "spongy" ice and which will block most regulator valves.

The control of the flow of the fuel between the regulator and the engine is controlled by the metering valve which may take the form of a plurality of injectors which are operated to provide a desired fuel flow. The volume of gaseous fuel required for fuelling an engine normally necessitates provision of a number of injectors which must be capable of supplying fuel at the desired rates for idling up to maximum power, which may be a 1:40 range.

Conventional injection systems commonly utilize "multi-point" fuel injection systems in which at least one solenoid operated injector valve is provided for each engine cylinder. Sensors measure various engine operating parameters and an engine control system equates the inputs from the sensors to a desired fuel supply which is metered by, for example, operating the injectors for timed intervals, or varying the pressure of the fuel supplied to the injectors.

In "single-point" fuel injection a metered mass of fuel is supplied to a common inlet manifold. A form of such fuel injection for use with compressible fuels such as methane and propane is disclosed in U.S. Pat. No. 4,487,187 to Petro, entitled Electronically Controlled Fluid Flow Regulating System. The system is provided with a metering valve including a plurality of parallel lines, each of which contains a solenoid valve, operated in response to digital signals produced by an electronic digital processor. The valve orifice sizes, and the relative flow rates through the valves, are proportional to successive powers of two, and the fuel pressure differential in the system is maintained such that critical or choked flow is maintained through the orifices.

In common with other binary valves of this form, such as the valve described in U.S. Pat. No. RE 29,383 to Gallatin et al.,m the flow through the valve increases/decreases in small incremental steps, the relative size of the steps between minimum and maximum flow through the valve decreasing as the number of valves is increased. However, increasing the number of valves increases the bulk and expense of the metering device.

Further, binary systems such as those disclosed in the Petro and Gallatin et al. patents have poorest flow resolution at low flowrates, which tend to be the most critical for engine operation. Vehicle engines must operate over a wide dynamic range of fuel flows, typically around 35:1. At any point in the fuel delivery range, a fuelling system should be capable of adjusting the fuel flow by 0.25%. In, for example, a 12-bit binary valve for providing a flowrate of 4096 Standard Cubic Feet per Hour (SCFH), that is a binary valve having twelve valves which increase in flow capacities following a binary sequence, at the lowest point of the dynamic range, the minimum increment to the next flow point represents 0.85% of that flow. Thus, such systems would not be capable of controlling the fuel flow within the desired range (0.25%), and an engine equipped with this form of binary metering valve would operate inefficiently and have difficulty in conforming with proposed emission regulations which require precise control of the fuel supply.

SUMMARY OF THE INVENTION

According to a first aspect of the present invention there is provided apparatus for controlling the rate of flow of a fluid from a common inlet to a common outlet. The apparatus comprises a plurality of fluid conducting lines having a plurality of flow capacities, the lines being connected in parallel between the common inlet and the common outlet such that the total flow from the common inlet to the common outlet is equal to the sum of the separate flows through the individual lines. The apparatus further includes a pulsing fluid control valve in each of at least two of said lines, and a bi-stable fluid control valve in each of the remaining lines, sensors for measuring parameters of the fluid sufficient to determine the potential mass flow through each control valve when open and control means adapted to control selectively the opening and closing of the control valves and monitor the sensors to determine the potential mass flow through each control valve in accordance with the measured fluid parameters. The total fluid flow passing outwardly of the common outlet comprising a base flow component established by opening selected control valves to provide a continuous predetermined flow, discrete step changes in the base flow component being provided by opening and closing combinations of control valves, increments of fluid flow between the discrete steps being provided by opening at least one pulsing valve for a fraction of a predetermined time period to provide a desired average flow over the time period.

According to a second aspect of the present invention there is provided a method for controlling the rate of flow of a compressible fluid between a common inlet at a first pressure and a common outlet at a lower second pressure through the plurality of parallel fluid conducting lines adapted to provide a plurality of flowrates therethrough, each fluid conducting line being provided with a fluid flow control valve, at least two of the valves being pulsing valves, the remaining valves being bi-stable valves. The method comprises controlling selectively the opening and closing of the control valves to control the fluid flow passing outwardly of the common inlet by providing a base flow component established by opening selected bi-stable control valves to provide a continuous predetermined flow, discrete step changes in the base flow component being provided by opening and closing combinations of control valves, increments of fluid flow between the discrete steps being provided by opening at least one pulsing valve for a fraction of a predetermined time period to provide a desired average flow over the predetermined time period.

According to a third aspect of the present invention there is provided a fluid metering device for use in a compressible fuel injection system for an internal combustion engine comprising a body defining an inlet fluid manifold and a metered fluid manifold, and a fluid inlet for passage of fluid into the inlet fluid manifold. The device includes a plurality of valves for controlling fluid communication between the inlet fluid manifold and the metered fluid manifold, the body further defining a fluid outlet for passage of metered fluid from the metered fluid manifold. Sensors are provided for determining parameters of the inlet fluid and the metered fluid sufficient to determine actual mass flow of fluid through each of the valves. A device operating system includes valve control means for activating the valve actuators to open the valves in combinations and for time intervals to give a desired total mass flow of fluid through the valves.

BRIEF DESCRIPTION OF THE DRAWINGS

These and other aspects of the present invention will now be described, by way of example, with reference to the accompanying drawings, in which:

FIG. 6 is a sectional view on line 6–6 of FIG. 5a;

FIG. 7d is a sectional view on line 7d–7d of FIG. 7a.

DESCRIPTION OF PREFERRED EMBODIMENTS

Figure 1:
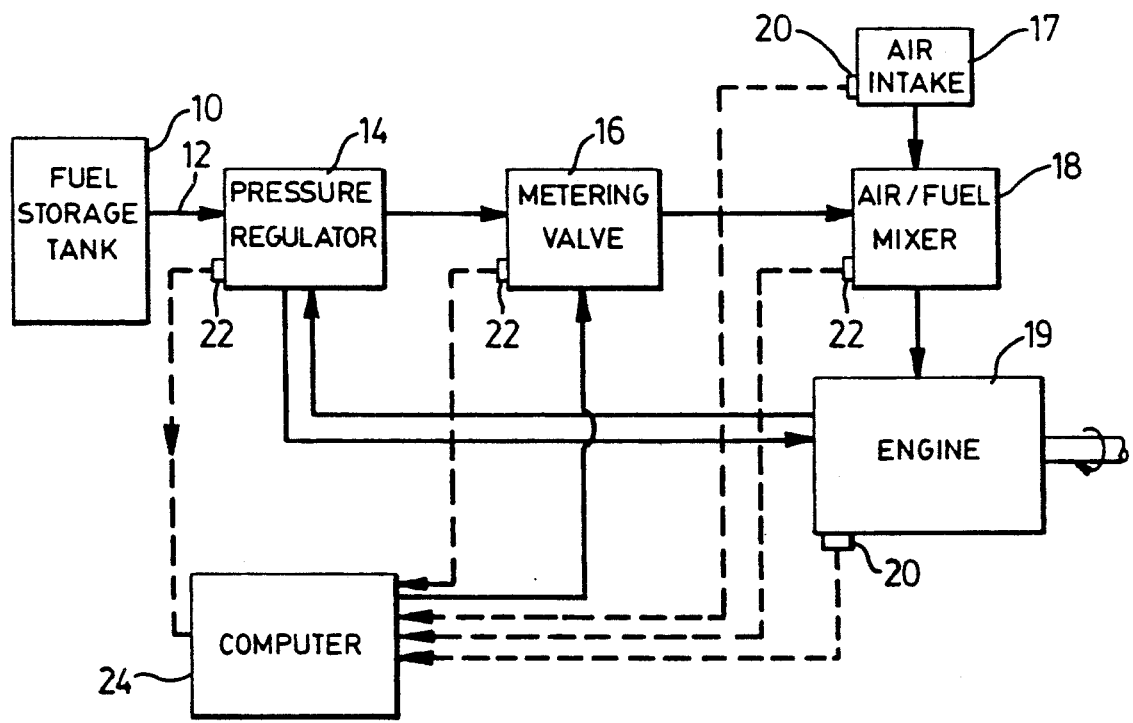
FIG. 1 is a block diagram of a vehicle engine provided with a fuel supply system in accordance with a preferred embodiment of the present invention.

Reference is first made to FIG. 1 of the drawings, which is a block diagram of the system of a preferred embodiment of the present invention. In this system, the fuel is stored under pressure in a fuel storage tank 10, the pressure varying with the type of fuel, for example natural gas being typically stored at around 3000 psi and propane at less than 312 psi, the amount of fuel in the tank 10 and the temperature of the fuel.

From the storage tank 10, a fuel line 12 leads to a fuel pressure regulator 14, where the pressure of the stored fuel is reduced to a pressure suitable for metering, and also to ensure that the fuel is in the gas phase for metering. From the regulator 14, the fuel passes through a metering device or valve 16, which supplies fuel to an air/fuel mixer 18, typically downstream of the engine air intake 17, where the fuel mixes with intake air and is drawn into the engine 19.

The metering valve 16 supplies fuel in accordance with the fuel demands of the engine 19, which are determined from various sensors 20 for detecting engine operating parameters, and various further sensors 22 which detect parameters of the fuel and operating parameters of the metering valve 16. The readings obtained by the sensors 20, 22 are fed into a system controlling computer 24, which is programmed to operate the metering valve 16 in accordance with the engine fuel requirements, as determined by manipulation of the sensor readings.

Figure 2:
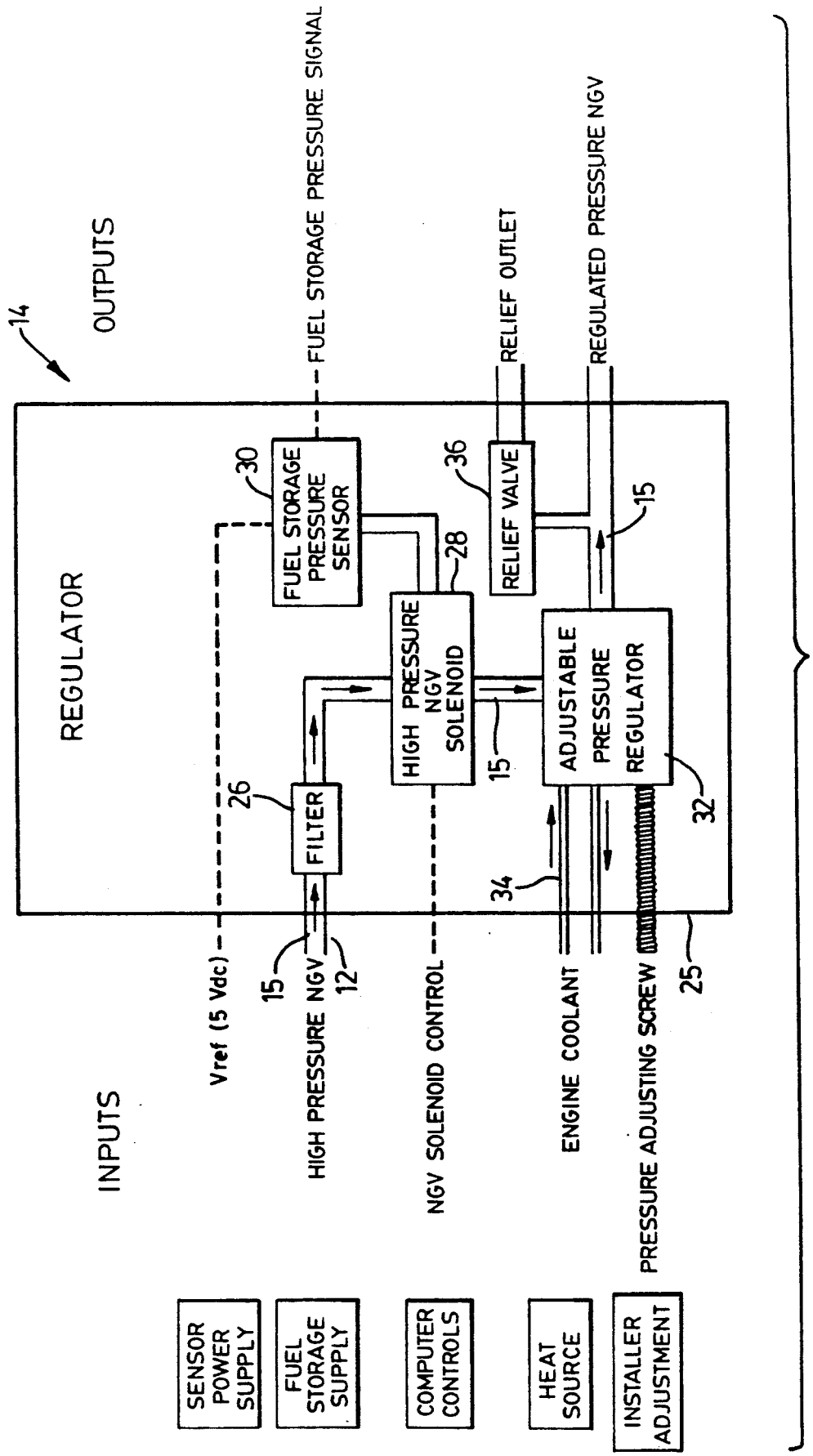
FIG. 2 is a block diagram of a fuel pressure regulator of the fuel supply of FIG. 1.

The fuel storage tank 10, and the fuel lines 12 are conventional, and as mentioned above, supply fuel to the pressure regulator 14, which will now be described with reference to FIGS. 2 and 3 of the drawings. Reference is first made to FIG. 2, which is a block diagram indicating the main components of the regulator 14, and the path of fuel therethrough (indicated by arrows 15). The fuel line 12 is attached to the regulator by means of a conventional inlet fitting. The fuel is then passed through a filter 26 to remove any particulate matter from the fuel. Downstream of the filter 26 is a high pressure shut-off solenoid 28, which is used to shut off the fuel supply when the engine is turned off.

The pressure of the fuel is a function of the amount of fuel in the fuel storage tank 10, and also of the fuel temperature. Thus, by measuring the fuel temperature and pressure, the amount of fuel in the tank can be determined. A high pressure sensor 30 is provided in the regulator for this purpose, downstream of the shut-off solenoid 28. A signal from the sensor 30 is supplied to the system computer 24 which is programmed to combine the pressure reading with the reading from a temperature sensor (not shown) to provide a fuel level indication.

Downstream of the solenoid 28, the high pressure fuel passes through an adjustable pressure regulator valve 32 which is adjusted to lower the pressure of the fuel to a desired level, for example, natural gas stored at 3000 psi may be reduced to pressure of 100 psi.

The sudden expansion of the fuel results in a corresponding drop in fuel temperature. Particularly when using gaseous fuel, it is desirable to maintain the fuel temperature fairly close to ambient to maintain its state and maximize its energy density: with propane, a sufficiently low temperature may result in the propane returning to the liquid phase; and with natural gas less dramatic drops in temperature may result in the formation of "hydrates", a spongy, ice-like material formed by water present in the fuel freezing and forming a lattice with fuel molecules which will obstruct, and block the flow of fuel. This cooling is overcome by heating the block, in this example by passing engine cooling fluid through a passage 34 in the regulator block.

In the event of a failure of the regulator valve 32, possibly combined with the failure of the solenoid 28, the high pressure of, for example, stored natural gas could result in the explosive destruction of the regulator. In order to minimize this possibility, a pressure relief valve 36 is provided downstream of the regulator 32, to allow for the release of pressure above a predetermined limit, before damage to the regulator 14 and metering valve 16 occur.

Reference is now made in particular to FIGS. 3a–3e of the drawings which illustrate the arrangement of the various components of the pressure regulator 14, mounted on a regulator block or body 38. As the regulator assembly must be accommodated in the restricted space of a vehicle engine compartment, the assembly is compact and is arranged such that the various connections between the assembly and other engine components can be made conveniently and in a space-efficient manner.

Figure 3A:
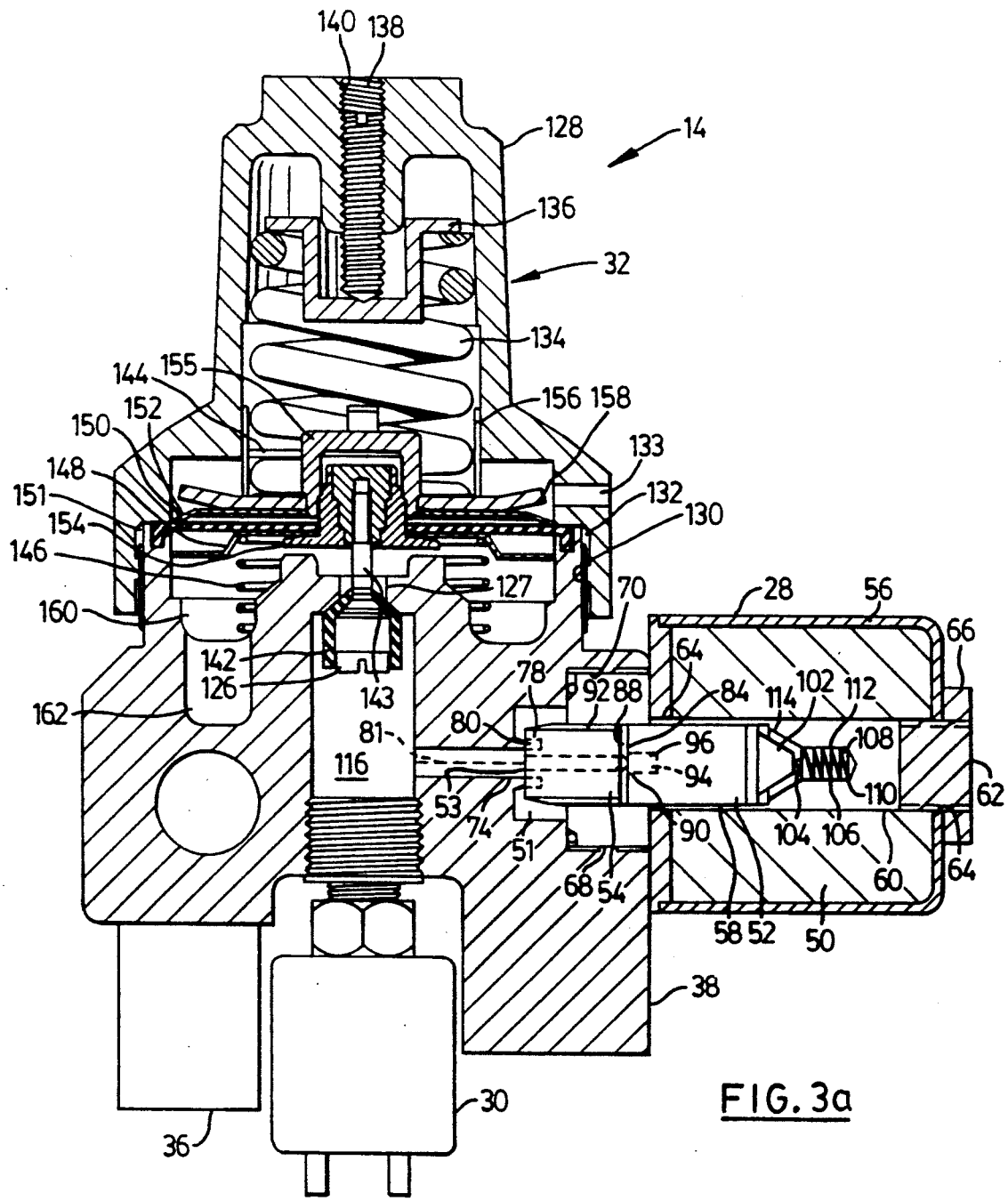
FIG. 3a is a sectional view of a fuel pressure regulator of the fuel supply system of FIG. 1, taken on line 3a–3a of FIG. 3b.

For ease of description and understanding, the regulator assembly will be described with reference to the particular orientation f the regulator seen in FIG. 3a, which illustrates the regulator body 38, a regulator valve assembly 32 mounted on an upper portion of the body, a high pressure solenoid 28 mounted on the side of the body, and a high pressure sensor 30 and relief valve assembly 36 mounted on a lower portion of the body.

An inlet fitting 42 (FIG. 3d) is provided for connection to the fuel line 12 leading from the fuel storage tank 10. The fitting 42 is attached to the main body at the mouth of an inlet passage 44 and is located in a stepped cylindrical passage 45 which accommodates a cylindrical section sintered metal filter 26, preferably fabricated of steel or brass. The filter 26 is relatively long (typically 2 cm), and has a correspondingly large surface area, such that the pressure drop over the filter 26 is minimal. Further, in the unlikely event of the filter 26 becoming blocked, the filter 26 is strong enough to withstand the pressure exerted by the fuel and will not collapse and damage the interior of the regulator. The filter 26 is held in place by a retaining spring 46 one end of which abuts a surface of the inlet fitting 42, and seats on an annular gasket 48 located around the mouth of the passage 44.

Directly downstream of the inlet passage 44 is the high-pressure solenoid 28 (FIG. 3a), which, when de-energised, isolates the regulator 14 from the fuel storage tank 10. The passage 44 intersects with a first inlet chamber 51 for communication with an inlet orifice 53 leading to a second main-inlet chamber. The solenoid coil 50 will normally be activated on turning on the ignition of the vehicle to allow passage of fuel between the chamber 51 and the orifice 53, and due to the relatively high pressure of the fuel supply, a solenoid having magnetically latched pilot and primary pistons 52, 54 is provided, the operation of which will be described herein below.

The solenoid coil 50 is contained within a suitable casing 56, mounted on the body by means of a solenoid tube 58. The coil 50 is of course hollow and accommodates a smooth-walled, cylindrical portion 60 of the tube 58. A threaded, first end 62 of the tube 58 extends from a centrally located aperture 64 in the casing 56, and receives a complementary nut 66 which secures the casing 56 and coil 50 on the tube 58. The other end 68 of the tube is also threaded, but is of greater cross-section than the first end 62 and is adapted to engage a threaded bore 70 in the regulator body 38.

The tube 58 is solid over approximately half of the length from the first end 62. The remainder of the tube 58 is hollow and accommodates the pistons 52, 54. The primary piston 54 extends beyond the other end of the tube 58. When the solenoid is deactivated the inlet orifice 53 is closed, the primary piston 54 bearing against the surface of an annular raised portion 74 which surrounds the orifice 53. The proximal end of the piston is provided with an annular recess 78 to accommodate a resilient annular pad 80 to form a seal with the raised portion 74. A central bore 81 extends through the piston 54 and the pad 80 to the distal end of the primary piston 54, adjacent the pilot piston 52. The distal end of the primary piston 54 is provided with a raised nipple 84 with a relatively small diameter throughbore 90 (typically 0.016" dia.).

The piston 54 is substantially cylindrical and is a fairly close fit in the tube. To provide for fluid communication between the first inlet chamber 51 and the gap 88 between the ends of the pistons, the proximal end of the primary piston is tapered, and four longitudinal slots 92 are provided in the outer surface of the piston, the purpose of the slots being described hereinbelow.

In the closed configuration, the end of the pilot piston 52 bears against the nipple 84 of the primary piston 54 to close the throughbore 90. The end of the piston 52 is provided with a circular recess 94 to accommodate a resilient cylindrical pad 96 which bears against the nipple 84. The distal end of the pilot piston features a frusto-conical portion 102, the end of this portion including an annular bearing surface 104 and a cylindrical stub 106 for mounting a coil spring 108, the opposite end of which bears against the end wall 110 of the tube. The spring 108 tends to push the pistons 52, 54 to close the inlet orifice 53. The spring 108 is located in a cylindrical recess 112 in the tube, and the end of tube 58 is provided with a 60° conical taper at 114, corresponding to the taper on the end of the pilot piston 52, the tapering ends of the piston and tube 58 allowing for a longer pull of the piston.

When the coil 50 is energised, the pilot piston 52 is pulled towards the end wall 110, against the spring 108. Initially, the primary piston 54 remains in place, as the pressure force acting on the distal end of the piston 54 is greater than the pressure force exerted by the gas in the main inlet chamber, exerted over the area of the orifice 53, and the pull on the piston 54 from the energised solenoid 50. When the pilot piston 52 is retracted, the end of the throughbore 90 is uncovered, and the high pressure gas from the inlet passes from the inlet chamber 51, through the slots 92 to the distal end of the piston 54, into the bore 80 and the orifice 53. After a short time, the pressure in the main inlet chamber rises to a level whereby the net pressure forces on the piston 54 are negligible, and the pull on the piston from the energised solenoid is sufficient to retract the piston 54 allowing gas to flow past the proximal end of the piston directly from the inlet and through the orifice 53.

The orifice 53 extends into a main inlet chamber, which is in the form of a chamber 116 formed in a central bore in the body. The pressure sensor 30 forms one end wall of the chamber 116, and has a threaded coupling portion 120 for engaging a complementary threaded portion 122 of the bore. The opposite end of the bore is provided with a metering orifice 127 which accommodates the metering pintle 126 of the adjustable regulating valve 32. The metering orifice leads into an outlet chamber 160.

The valve assembly 32 is mounted on an upper portion of the regulator body 38 and is contained within a spring tower or casing 128 in the form of a zinc casting with a threaded lower portion 130 for engaging a complementary threaded portion 132 on the regulator body, and having a breather hole 133 above the lower threaded portion 130. The upper end of the casing 128 accommodates a compression spring 134, the upper end of the spring bearing against a spring end plate 136, the position of the plate being controlled by adjusting a recessed adjusting screw 138 located in a threaded bore 140 in the upper end of the casing 128.

The metering pintle 126 includes an enlarged cylindrical head with a conical base, a resilient pintle seal 142 being positioned between the head and the metering orifice 127. An elongate portion 143 of the pintle 126 extends through the orifice 127 and engages a pintle retainer 144 which retains the metering pintle in the orifice 127.

The pintle retainer 144 abuts a diaphragm end cap 155 which is mounted to a spring plate 158. The lower end of the compression spring 134 bears on the spring plate 158, through a cup-shaped spring damper 156, and through the spring plate 158 and a diaphragm backing washer 152 on a diaphragm 150 which is mounted by means of a downturned edge in an annular groove 151 on the upper end of the body 38. The diaphragm is retained in position by the clamping action of the casing on the body 38. On the other side of the diaphragm 150 is a damper spring 146 which extends between the return spring washer 148 abutting the lower face of the diaphragm 150 and the regulator body 38.

Positioned between the sides of the pintle retainer 144 and the diaphragm end cap 155 is a bushing portion of a diaphragm stop 154, a flange portion extending from the bushing portion between the return spring washer 148 and the body 38, thus limiting the downward movement of the diaphragm 150. The flange portion opposes a raised cruciform surround above the metering orifice 127.

To adjust the regulator, the position of the spring end plate 136 is varied, which changes the downward spring force on the diaphragm 150. The spring force is balanced with the pressure of the regulated fuel in the chamber 160 acting on the other side of the diaphragm 150. When the pressure in the chamber 160 drops, the spring force will thus lift the pintle from the sealing position at the orifice 127 and allow fuel to flow past the pintle 126, the pressure of the fuel being reduced as the fuel is throttled on passing the pintle.

Figure 3B:
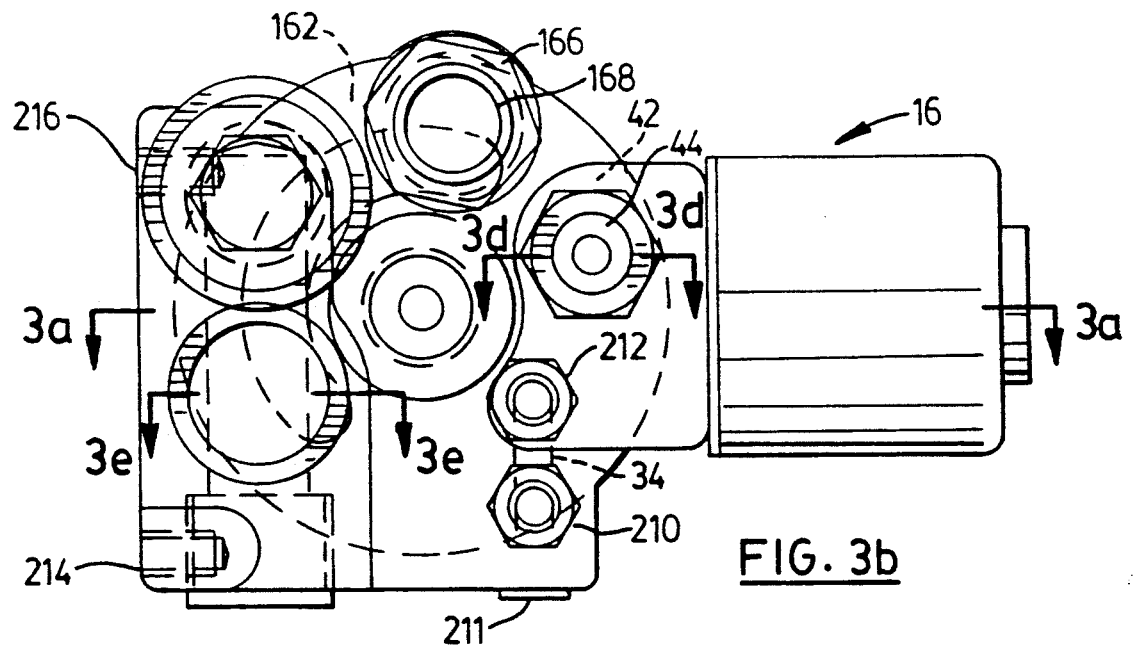
FIG. 3b is a bottom plan view of the fuel pressure regulator.
Figure 3C:
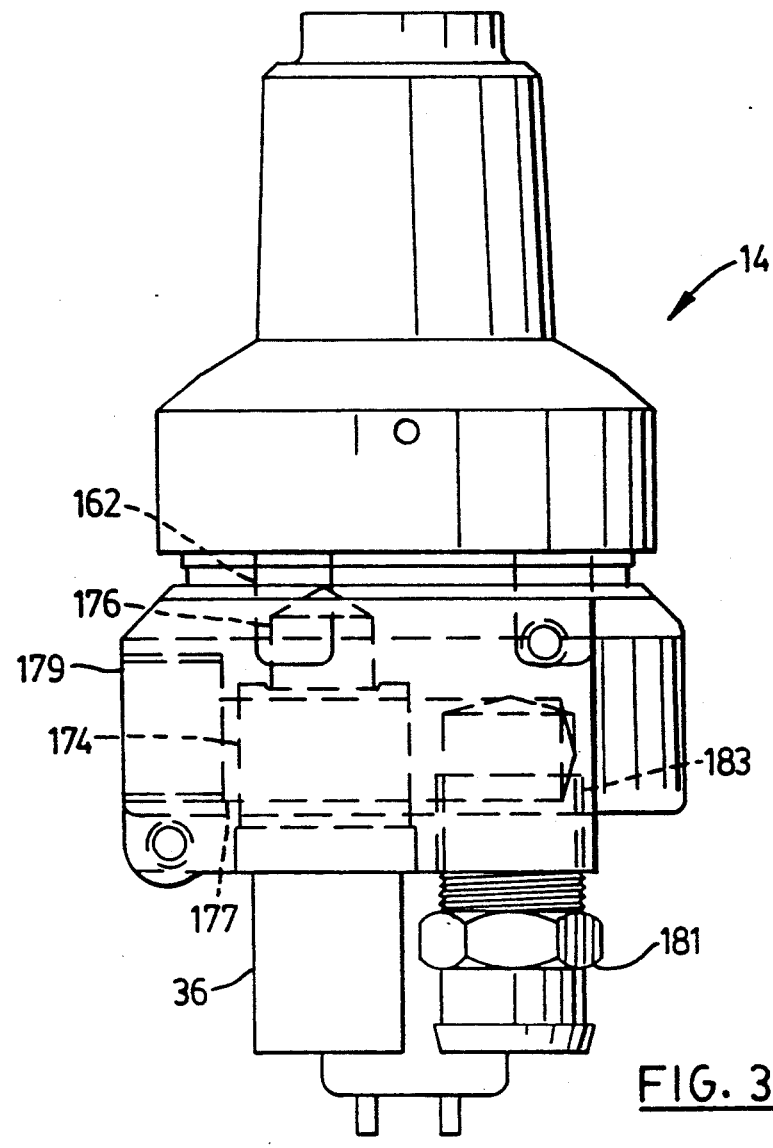
FIG. 3c is an end elevational view of the fuel pressure regulator.
Figure 3D:
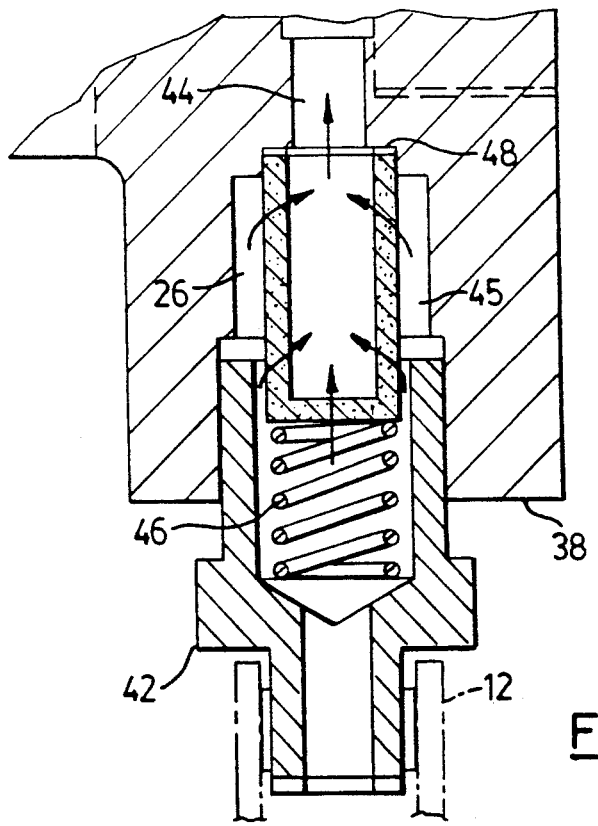
FIG. 3d is a sectional view on line 3d–3d of FIG. 3b and illustrating details of a fuel inlet.

The lower pressure gas flows into the annular chamber 160, which is formed in a channel in the upper end of the regulator body., the channel being deepened over an arc-shaped portion 162, one end of which communicates with an outlet fitting 166 (see FIG. 3b). The fitting 166 is located in a bore which intersects one end of the arc-shaped portion 162.

The relief valve 36 (FIG. 3c) is located in a cylindrical bore 174 in the base of the body, which intersects a horizontal relief bore 177, the bore 174 extending into a smaller diameter bore extension 176, which intersects the other end of the arc-shaped portion 162. The relief valve normally seals the end of the bore extension 176, and when opened by a higher than normal pressure in the chamber 160 allows gas to flow from the regulator through one of two alternate outlets. In this example an outlet 179 at one end of the relief bore 177 is plugged, while an upright outlet fitting 181 is provided in a bore 183 which intersects the other end of the relief bore 177.

Figure 3E:
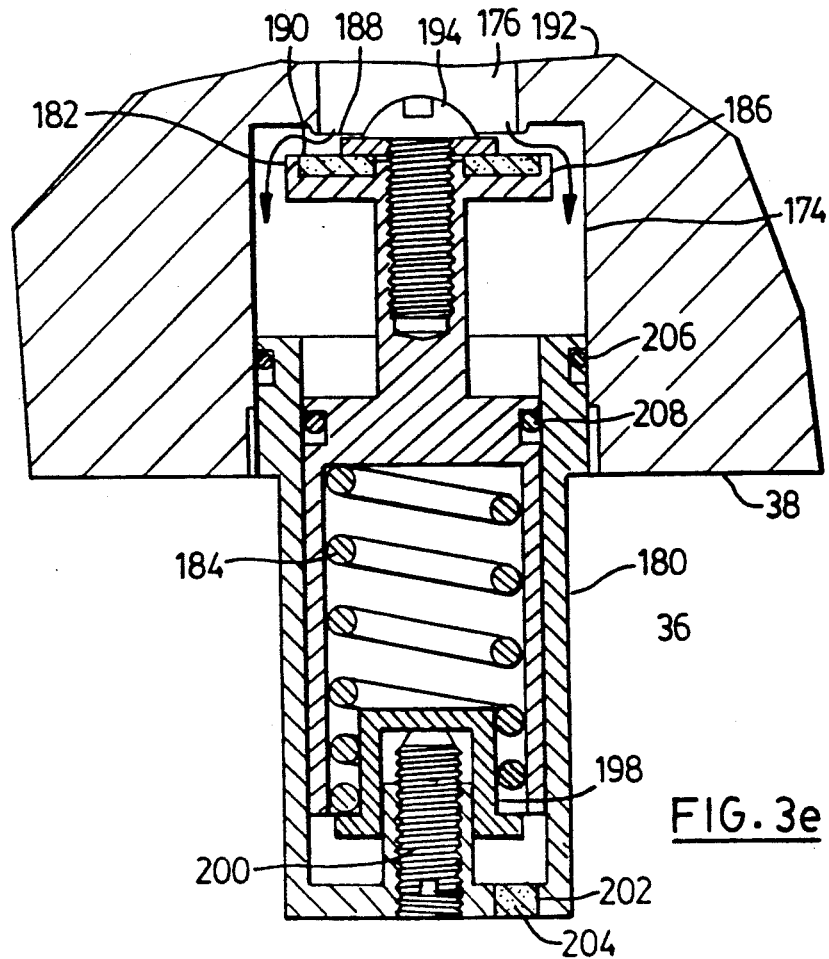
FIG. 3e is a sectional view on line 3e–3e of FIG. 3b and illustrating details of a relief valve assembly.

The relief valve 36 is shown in more detail in FIG. 3e, being illustrated in the open configuration, and comprises a valve housing 180, a relief valve piston 182 normally held to close the valve opening 188 at the base of the bore 176, and a compression spring 184 which acts between the piston 182 and the housing 180. The end 186 of the piston 182 that closes the relief valve opening 188 includes a relief valve seat 190, held in place by a plated washer 192 and plated machine screw 194.

The end of the spring 184 not acting on the piston is mounted on a spring end positioner 198, the location of which may be adjusted by an adjusting screw 200, accessible from the exterior of the regulator.

The end of the housing 180 includes a vent opening 202 provided with a vent filter 204. O-ring seals 206, 208 are provided between the housing 180 and body 38 and the relief valve piston and housing.

With the valve in the open configuration, as illustrated, fuel may flow from the chamber 160, into the bore 176, past the end of the piston 182 and into the relief bore 177. From the relief bore the fuel flows thorough the outlet fitting 181 (FIG. 3c), which may be provided with a hose to carry the fuel away from the engine.

In the event of a regulator valve failure, the flow capabilities of the relief valve and the associated outlets do not permit the build-up of dangerously high pressures in the regulator. This should prevent the destruction of the regulator and subsequent damage to the vehicle.

As was mentioned above, the expansion of the fuel in the regulator results in cooling of the fuel. It is desirable to minimise this net cooling, to prevent the temperature of the fuel falling below the critical temperature and returning to the liquid phase (propane only). Also hydrates may form in the cooled fuel, resulting in restriction and blocking of the regulator flow path. While these hydrate problems are primarily associated with fuels such as natural gas, rather than propane, it is also generally preferable to maintain the regulator at a sufficient temperature to prevent the build-up of ice on the exterior of the body.

The heating of the regulator is achieved by use of the engine coolant, typically water and "anti-freeze", which is passed through the body 38. The heating fluid inlet 210 is located on a lower portion of the body (see FIG. 3b). An alternate inlet is provided 211 on the side of the body, the inlet not in use being plugged (in this example, inlet 211 is plugged). The heating fluid passage 34 extends in a U-shaped path through the body to an outlet 212 adjacent the inlet 210. The passage 34 is adjacent the fuel inlet 44, which is located in the "deepest" portion of the regulator, and thus the routing of the passage through this portion provides a long heat path and thus is more effective in heating the regulator.

From FIG. 3b is will also be noted that one side of the body is provided with a planar mounting surface 214 provided with threaded bores 216 to receive bolts extending from some suitable mounting structure. It will also be noted that the mounting side of the regulator is free of inlets and outlets which might make mounting more difficult.

Figure 4:
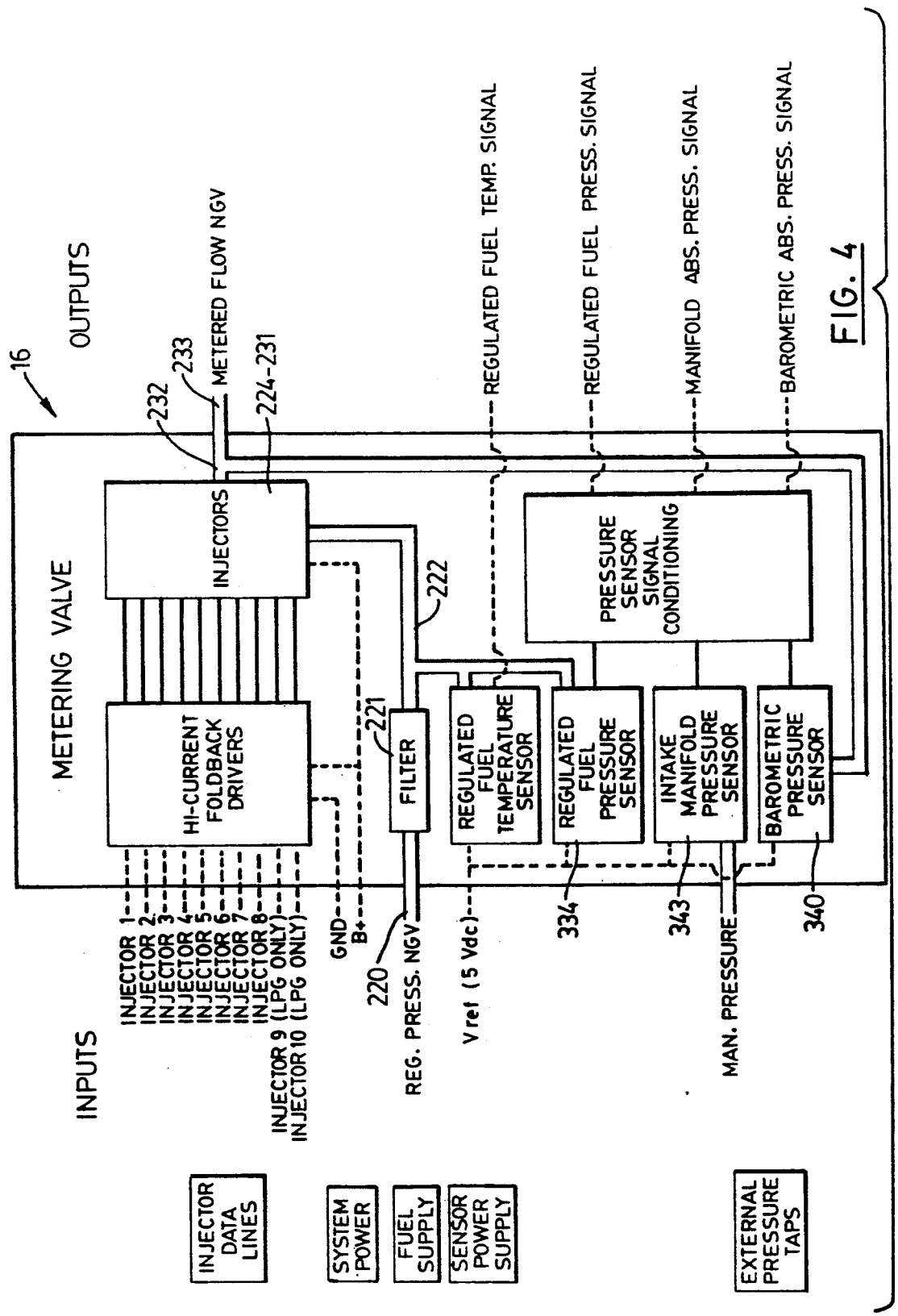
FIG. 4 is a block diagram of a fuel metering valve of the fuel supply system of FIG. 1.
Figure 5D:
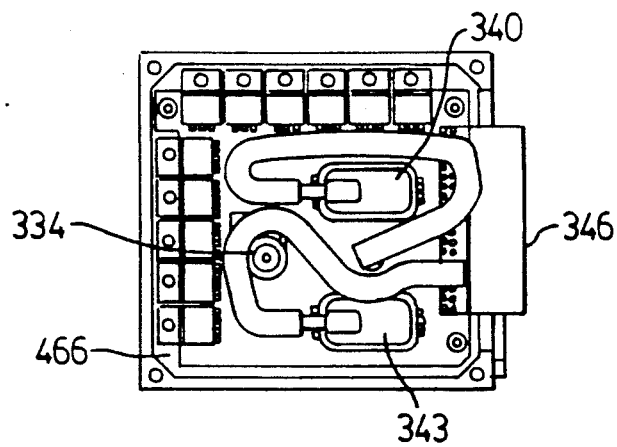
FIG. 5d is a pictorial view showing the top side of the metering valve electronic control board.
Figure 6:
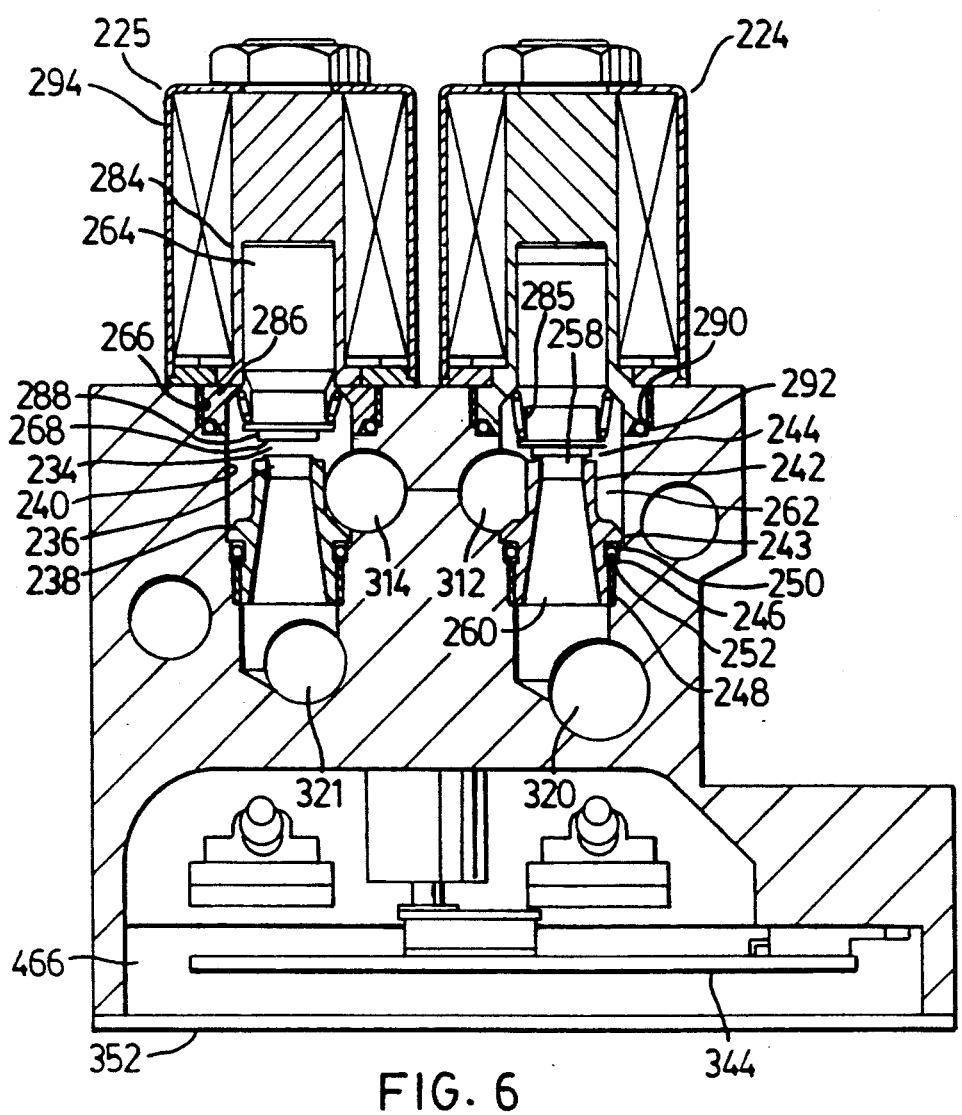

From the regulator 32, the fuel, now at a suitable pressure for metering, passes through conduits to the metering valve 16, illustrated in block diagram form in FIG. 4 of the drawings, and further, in FIGS. 5–7 of the drawings, reference being made first to FIG. 4. The regulated fuel passes from the regulator through an inlet 220 provided with a filter 221 into an inlet manifold 222. The manifold communicates with, in this example, eight bi-stable fuel injectors and leads to an outlet 233 linked to the air/fuel mixer. Various sensors and control circuitry is illustrated in FIG. 4 and will be described hereinbelow following a physical description of the metering valve and its various elements.

Figure 5A:
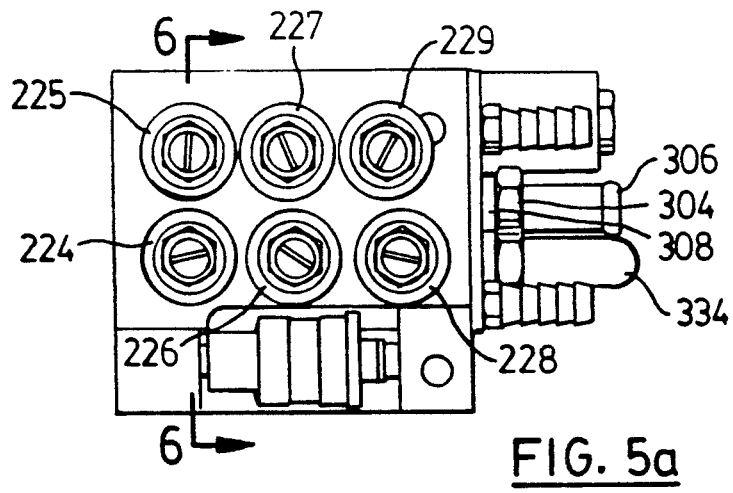
FIG. 5a is a top plan view of the fuel metering valve of the fuel supply system of FIG. 1.
Figure 5B:
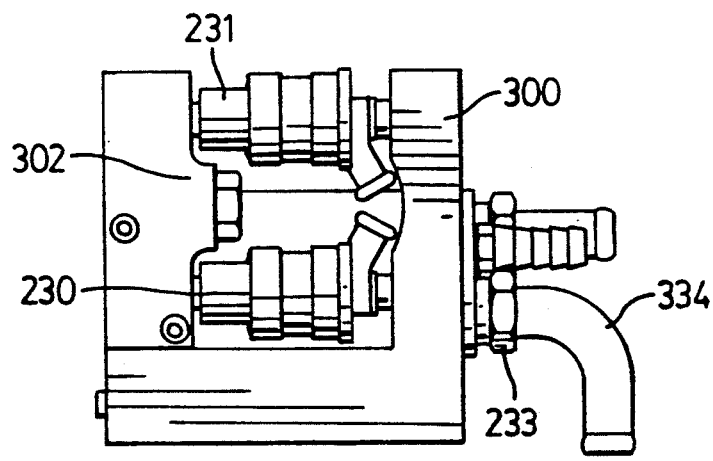
FIG. 5b is a side elevational view of the fuel metering valve.
Figure 5C:
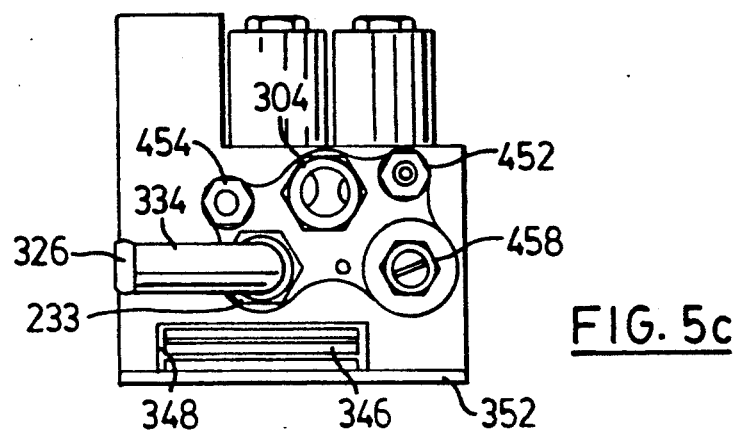
FIG. 5c is an end elevational view of the fuel metering valve.

For each of description, FIG. 5a is designated a top plan view, and FIGS. 5b and 5c represent front and side elevations of the metering valve. Further, the term longitudinal, when used herein with reference to the valve body, indicates perpendicular to the section line 6–6 of FIG. 5A, while the term transverse indicates a direction parallel to the section line.

As mentioned above with reference to FIG. 4, the fuel passes through the inlet 220 provided with a filter into a main inlet manifold and communicates with eight bi-stable fuel flow control valves on 224–231 with orifices of various sizes. Six "high-flow" injectors 224–229 are mounted in the same plane, and two "low-flow" or pulsing injectors 230, 231 are mounted parallel to one another perpendicular to the other injectors, between mounting posts 300, 302. A common outlet manifold 232 communicates with the outlets of the injectors and leads to a valve outlet 233.

The inlet manifolding is arranged such that all injector orifices operate at substantially the same stagnation pressure, regardless of which combination of orifices are flowing. Further, the outlet manifolding is arranged such that all orifices operate at a back pressure low enough to assure that each injector orifice remains sonic, regardless of which combination of orifices are flowing. In this description, the term sonic is used to indicate choked flow in the orifice, or that the pressure differential across the orifice is such that variations in downstream pressure do not affect the flow rate through the orifice. The manifolding will be described with reference primarily to FIGS. 7a–7d of the drawings, the description of the inlet manifolding being followed by a description of the injector configuration, as shown in FIG. 6 of the drawings and, subsequently, by a description of the outlet manifolding.

Figure 7A:
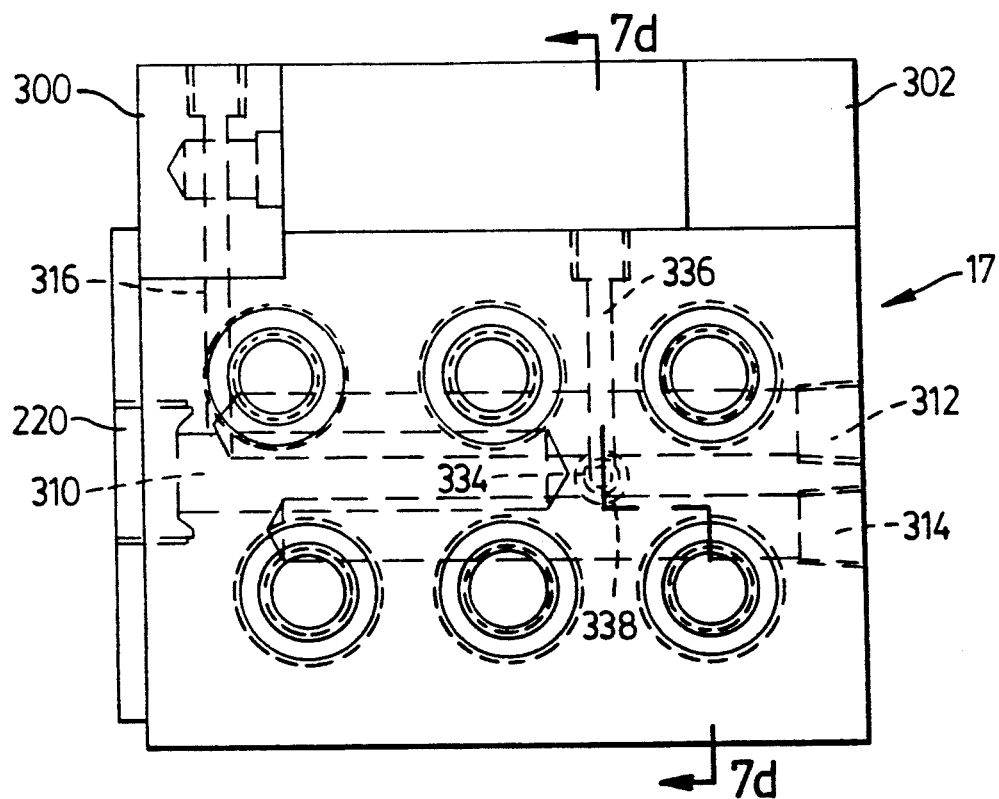
FIG. 7a is a top plan view of the valve block of the fuel metering valve showing the hidden detail of the inlet manifolding.
Figure 7B:
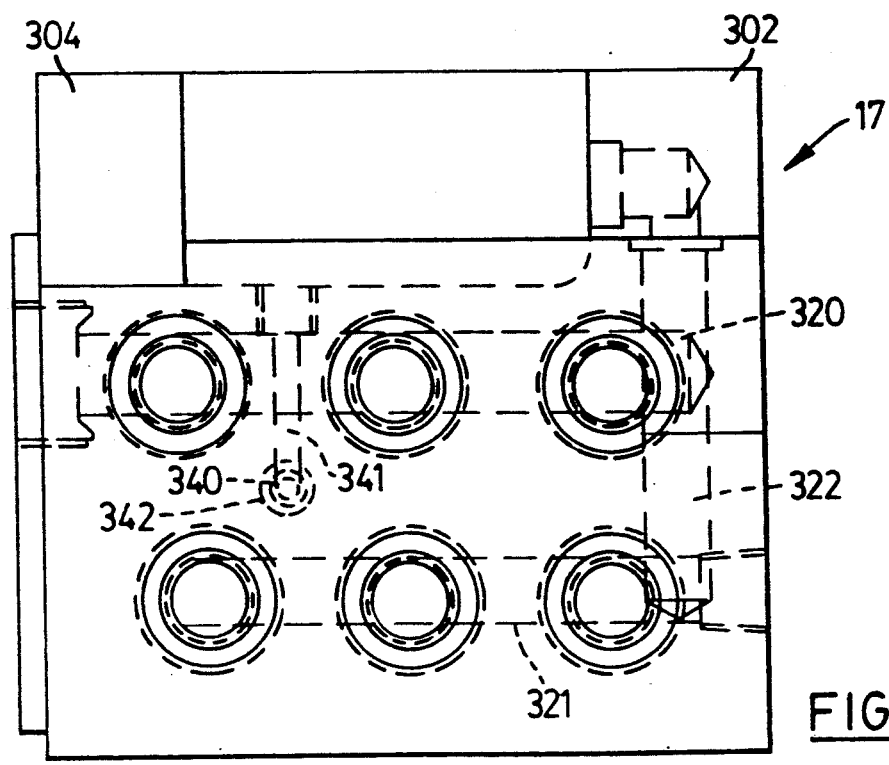
FIG. 7b is a top plan view of the valve block of the fuel metering valve showing the hidden detail of the outlet manifolding.
Figure 7C:
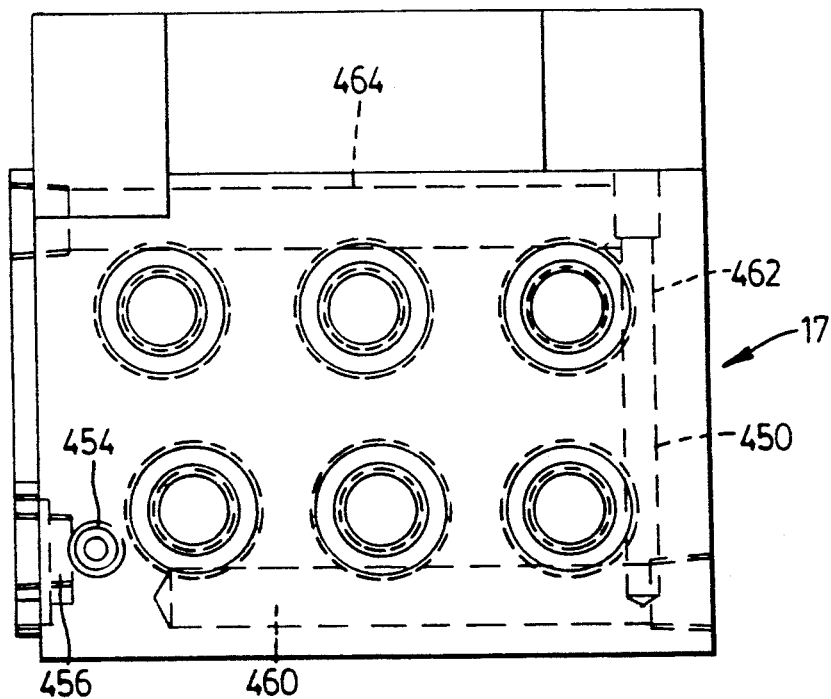
FIG. 7c is a top plan view of the valve block of the fuel metering valve showing the hidden detail of the coolant manifolding.

FIGS. 7a–7b illustrate the metering valve block 17, and each one of the Figures illustrate a different aspect of the valve body manifolding. Reference is first made to FIG. 7a, which illustrates the inlet manifolding.

The inlet 220 is located in an end face of the valve body. An inlet fitting 304 (FIG. 5a) is provided and comprises a hose connector portion 306, for fitting within the connecting hose (not shown) leading downstream from the regulator. The lower portion of the fitting engages within a collar 308 that extends from the valve body and accommodates a filter (not shown). Extending from the collar 308 and into the valve body is a cylindrical longitudinal bore 310, which intersects two parallel longitudinal bores 312, 314 extending from the other end of the valve body. These bores 312, 314 intersect the upright bores provided for accommodating the six high-flow injectors 224–229. A transverse bore 316 intersects the inlet bore 310 to supply fuel to the low-flow injectors 230, 231, and is in communication with an upright inlet bore in communication with injector inlets at the top end of the injectors 230, 231, in the mounting post 300.

For the low-flow injectors it is also possible to extend the inlet bore to provide traps for the collection of impurities in the fuel, this being particularly useful for use in propane metering, propane often containing an oily/powdery residue that might otherwise block the orifices.

As is evident from the Figures, and the inlet manifolding configuration, the gas feed location differs between the low-flow and high-flow injectors, that is the low injectors utilize top feed whereas the high-flow injectors utilize bottom feed. FIG. 6 is an enlarged sectional view through a portion of the metering valve and illustrate details of two high-flow injectors (mountings for the low-flow injectors not shown). The injector 224 illustrated in the right hand side of FIG. 6 is shown closed, the injector 225 shown on the left hand side of the Figure is shown in the open position, providing a flow path 234 for fluid from the inlet manifold 222 or bore 314 through the injector orifice 236, to the outlet manifold 233. The orifice 236 is formed in a non-magnetic insert 238 which is fitted into a larger opening 240 in the body of the metering valve or alternatively as a permanent part of a unit injector. However, providing a separate insert allows each injector to be constructed from standard parts, differing only in the insert, or more particularly in the orifice size in the insert.

The insert 238 includes a substantially cylindrical upper portion 242, having a flange 243 formed at the base thereof, of slightly greater diameter than the opening and which engages an upper edge of the opening. The orifice is located in the centre of the upper portion, surrounded by a raised portion 244 which extends beyond the planar upper surface of the portion 242.

Directly below the flange 243 is a portion 246 of slightly smaller diameter than the opening, and below this portion is a portion 248 of diameter corresponding to the opening 240, which creates an annular space 250 between the insert and the wall of the opening. A resilient o-ring 252 is located in the space 250.

The orifice extends through the insert and is preferably of the converging diverging type, having a short cylindrical portion 258 and a frusto-conical portion 260 which opens into the outlet manifold. With an orifice of this form, the pressure differential necessary to provide sonic flow through the orifice may be as low as 15%, whereas for a sharp-edged orifice the pressure differential may have to be as high as 53%.

To provide an immediately available reservoir of fuel when the injector opens, the upper portion 242 of the insert is located in a chamber 262 formed in the valve body, which provides a space surrounding the orifice opening and which one of the bores 312, 314 intersects. The upper portion of each chamber accommodates a lower portion of a magnetic injector plunger 264, which is movable to open and close the orifice. The lower end face 266 of the plunger is provided with a resilient washer seal 268 to form a seal with the raised portion 244 of the insert when the injector is closed. Alternatively, metal to metal sealing may be used. A non-magnetic injector core tube 284 slidably receives the plunger, the tube including a seating portion 286 which sits in an enlarged portion 288 of the chamber 262, the seating portion 286 itself forming an upper wall of the fuel receiving part of the chamber 262. The seating portion 286 is substantially annular and includes a circumferential groove 290 having a sloping base, to provide a space between the seating portion 286 and the valve body for accommodating a resilient o-ring 292. A compression spring 285 is mounted on the plunger 264 and seats against the core tube creating a force which causes the plunger to seal against the orifice.

The upper portion of the core tube fits within a magnetic coil case 294 adapted to accommodate the injector coil. The case is mounted on an upper surface of the core tube seating portion and the valve body.

As mentioned above, the low-flow injectors in this example of a metering valve utilize top flow and are, in fact, conventional gasoline injectors, such as a Lucas type FJ12.

Below the high-flow injectors are longitudinal bores 320, 321 for receiving the gas after it has passed through the injectors. Three of the injectors communicate with a main outlet bore 320 (see FIG. 7b) while the other three communicate with a smaller diameter bore 321 that is liked to the main outlet bore 320 by a transverse bore 322. The transverse bore 322 also intersects the outlets of the low-flow injectors in the post 302. The main outlet bore 320 extends to the end of the valve body and accommodates an outlet fitting 334, which includes a hose connector 326 (see FIG. 5c).

For ease of construction, the valve body is formed by drilling a solid block. The various bores are formed by drilling the block, the open ends of the bores being sealed by plugs.

The particular valve illustrated is intended for use in metering both natural gas and propane, though for a typical propane application it is likely that the valve would be provided with a greater number of injectors and the injectors would be provided with orifice inserts having larger area orifices (the propane is at lower pressure and, therefore, has a greater volume). In both natural gas and propane applications it is desired to keep the fuel from cooling to the degree that hydrates will form in the fuel or that the fuel will return to the liquid state, as discussed above. To minimize this possibility, the valve body is provided with a passage 450 (FIG. 7c) for conveying a heating fluid, typically the engine cooling fluid, in a manner similar to the regulator. The passage extends around the six high-flow injector bores. The passage begins at an inlet 452 (FIG. 5c) provided with a suitable inlet fitting which is received by a short, cylindrical longitudinal bore which intersects an upright bore 454 which leads to a solenoid chamber 456. A solenoid 458 (FIG. 5c) is mounted on the end of the valve block and is operated to control the flow of fluid through the passageway, which is formed by three intersecting bores 460, 462, 464.

The lower portion of the block is provided with a recess 466 which accommodates various sensors and the power transistor circuitry necessary to operate the injectors. Three pressure sensors are provided in the valve body: an outlet pressure sensor 340 (FIGS. 5d and 7b) which measures the pressure of the fuel downstream of the injectors by means of a plugged transverse bore 341 which intersects the main outlet bore 320 and which communicates with the sensor 340, mounted through an upright bore 342 which extends from the recess; an inlet or regulated pressure sensor 334 (FIGS. 5d, 7a and 7b) located in an upright bore 338 which communicates with a transverse bore 336, which intersects an inlet bore 312 (FIG. 7d); and an intake manifold absolute pressure (MAP) sensor 343 which measures the pressure in the engine intake manifold via a vacuum hose. By recording the pressure sensed by the outlet pressure sensor before starting the engine it is also possible to obtain a reading for barometric pressure. A regulated fuel temperature sensor may also be provided (FIG. 4).

Figure 7D:
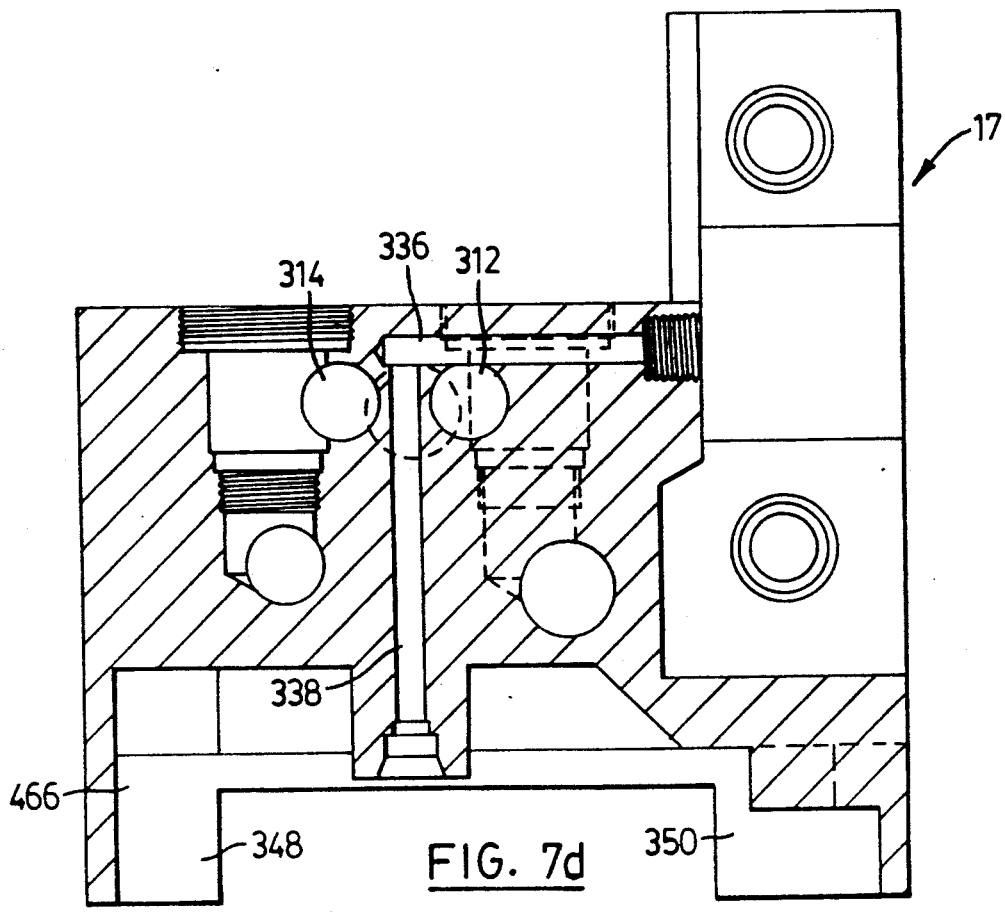

As is seen most clearly in FIG. 7d, the inlet pressure sensor transverse bore 336 just "nicks" the inlet bore 312 and the communicating opening between bores is located in an upper wall of the bore 312. This is intended to minimize the ingress of any dirt or impurities in the fuel into the pressure sensor manifolding. The outlet pressure sensor manifolding is similarly arranged.

A temperature sensor may also be provided for measuring the temperature of the fuel in the outlet bore from the low-flow injectors.

The sensors are all connected to a metering valve electronic control board 344 (FIG. 6) carrying the power transistor circuitry which operates the injectors. During operation of the injectors, the circuitry generates heat which is dissipated through the valve body. FIG. 4 includes a representation of the various sensors and the associated circuitry. An external connector 346 (FIG. 5d) is provided at one end of the board 344 and extends through an opening 348 in the recess wall 350.

The open end of the recess may be covered with a rectangular cover 352 which is attached to the valve body using fastening screws.

As mentioned above, the system control computer selectively operates the injectors to provide a desired fuel flow to the engine. The control system includes sensors to detect various engine parameters and the fuel condition, and thus determine the fuelling needs of the engine. Various other operating parameters of the system and the engine ancillaries are also determined, and are utilized to provide accurate control of the metering valve and thus accurate fuelling of the engine. A description of the control system and the various associated sensors, will follow hereinafter.

The variation in fuel flow is provided by opening selected ones of the high-flow injectors to provide a base flow component, and preferably also by opening at least some of the low-flow injectors for predetermined timed intervals, or by "pulsing" the low-flow injectors.

The orifice sizes of the injectors are selected to provide a suitable series of flow areas which can be manipulated to provide accurate fuelling over a wide dynamic range, typically 1:40 or 1:35. The orifice sizing, or more precisely the different mass flows of fuel through each injector orifice, requires careful selection in order to minimise the number of injectors required, and reduce the number of injector closings occurring.

Sonic mass flow through an orifice is:

$$Q(\text{actual}) = C \cdot A \cdot P \cdot \sqrt{\left(\frac{g \cdot k}{R \cdot T} \cdot \left(\frac{2}{k+1}\right)\right)(k+1)/(k-1)} \quad (1)$$

Where
C = orifice discharge coefficient
A = orifice area
P = absolute supply stagnation pressure
g = a dimensional constant
k = specific heat ratio of the fluid (temp. dependant)
T = stagnation temperature of gas just before the orifice
R = specific gas constant C, A, g are constant for each orifice, the combined effects of A and C being determined by testing each individual orifice during assembly of the metering valve, while P and T are determined by sensors to provide the actual flowrate for each orifice and k and R may be assumed for the known gas or be more accurately estimated from sensor data. For simplicity, the following description of the orifice flowrate sequences is in respect of conditions of constant temperature and pressure.

Each metering orifice $M_0$, $M_1$, $M_2$, $M_3$ and $M_n$ provides a respective gas flow $Q_0$, $Q_1$, $Q_2$ and $Q_n$.

In one ideal sequence, the orifice sizes are selected such that the mass flow follows the sequence:

$$Q_0 = 2^0 Q_0 = 1 \times Q_0$$
$$Q_1 = 2^0 Q_0 = 1 \times Q_0$$
$$Q_2 = 2^1 Q_0 = 2 \times Q_0$$
$$Q_3 = 2^2 Q_0 = 4 \times Q_0$$
$$\vdots$$
$$Q_{n-1} = 2^{n-2} Q_0$$
$$Q_n = 2^{n-1} Q_0$$

Note: in a non-ideal valve the mass flows for the first two units ($Q_0$ and $Q_1$) would each need to have a flowrate somewhat greater than $1 \times Q_0$ (ideal).

In this sequence it will be noted that the flowrates, apart from the first two, vary according to natural binary.

In a further ideal sequence, the orifice sizes are selected such that the mass flow follows the sequence.

$$Q_0 = 2^0 Q_0 = 1 \times Q_0$$
$$Q_1 = 2^0 Q_0 = 1 \times Q_0$$
$$Q_2 = 2^1 Q_0 = 2 \times Q_0$$
$$Q_3 = 2^2 Q_0 = 4 \times Q_0$$
$$\vdots$$
$$Q_{n-1} = 2^{n-2} Q_0$$
$$Q_n = 2^{n-2} Q_0$$

Note: in a non-ideal valve the mass flows for the first two units ($Q_0$ and $Q_1$) would each need to have a flowrate somewhat greater than $1 \times Q_0$ (ideal).

It will be noted that the flowrates, apart from the first two, and the last flowrate, which is equal to second last flowrate, vary according to natural binary.

In the preferred ideal sequence, the orifice sizes are selected such that the mass flow follows the sequence.

$$Q_0 = 2^0 Q_0 = 1 \times Q_0$$
$$Q_1 = 2^0 Q_0 = 1 \times Q_0$$
$$Q_2 = 2^1 Q_0 = 2 \times Q_0$$
$$Q_3 = 2^2 Q_0 = 4 \times Q_0$$
$$\vdots$$
$$Q_{n-3} = 2^{n-2} Q_0$$
$$Q_{n-2} = 2^{n-3} Q_0$$
$$Q_{n-1} = (Q_{n-3})+(Q_{n-2} = 2^{n-4}Q_0 + 2^{n-3}Q_0 = (2^{n-4}+2^{n-3})Q_0$$
$$Q_n = (Q_{n-3})+(Q_{n-2}) = 2^{n-4}Q_0 + 2^{n-3}Q_0 = (2^{n-4}+2^{n-3})Q_0$$

Note: in a non-ideal valve the mass flows for the first two units ($Q_0$ and $Q_1$) would each need to have a flowrate somewhat greater than $1 \times Q_0$ (ideal).

It will be noted that the flowrates, apart from the first two, and the last two flowrates which are equal and also the sum of the third and fourth last flowrates, vary according to natural binary.

As the sequences are similar, apart from the last two orifice flow rates, each will be referred to by reference to the last two "units" of flow, that is, last two units use natural binary (LNB), last two units have equal output (L2E), and last two units equal the sum of the previous two units (L2S).

There follows tables of ideal and practical configuration with actual flowrates for orifices following such sequences, to provide a maximum flow of 3000 standard cubic feet per hour (SCFH).

| Injector Number | LNB | L2E | L2S |
| --- | --- | --- | --- |
| 1 | 0–47 | 0–63 | 0–75 |
| 2 | 0–47 | 0–63 | 0–75 |
| 3 | 94 | 125 | 150 |
| 4 | 188 | 250 | 300 |
| 5 | 375 | 500 | 600 |
| 6 | 750 | 1000 | 900 |
| 7 | 1500 | 1000 | 900 |
| Total | 3001 | 3001 | 3000 |

In preferred systems, the total flow from the first two injectors will exceed the flow from the third injector, as mentioned in the notes above. This arrangement is preferred for two reasons: only a fraction of an injector's steady state flow capability can be used when the injector is "pulsing" to provide a continuously variable output flowrate, such that some "reserve" capacity is required; and if reserve of "excess" flow exists, it can be used to compensate for both transient and steady state flow errors from all of the injectors.

The use of only a fraction of an injector's steady state flowrate requires the pulsing injector to be shut off once each metering cycle. A typical (empirically supported) pulsed injector flow model can be expressed as:

$$Q[T] = Q_s \left[ \frac{T_{on} - T_{open} + T_{close}}{T_{on} + T_{off}} \right]$$

Where
$Q[T]$ = Pulsing injector flow rate
$Q_s$ = Steady state injector flow rate
$T_{on}$ = Injector on time control signal duration
$T_{open}$ = Time for injector to open
$T_{close}$ = Time for injector to close
$T_{on} + T_{off}$ = Time between spark plug firings For example, a typical injector may require 1200 µs to open and 900 µs to close. If the metering cycle were on a 6 cylinder engine running at 5200 rpm, then one cycle would last 3846 µs (i.e. the time between spark plug firings).

For such an injector the nominal minimum pulsed on time would be $T_{on} = T_{open}$, and the nominal maximum pulsed on time would be $T_{on} = T_{on} + T_{off} - T_{close}$. Under these conditions, a reasonable injector flow model predicts the minimum useable injector pulsed flow rate to be 900/3846ths (or 23.4%) of its steady state flow rate. As well, the injector's maximum predictable pulsed flow rate would be (3846−1200)/3846ths (or 68.8%) of its steady flow rate.

In the following sequence, a series of injector TRUTH TABLES are provided which illustrate examples of achieving, by various valve designs, a range of fuel flows. In each case, a range of flowrates is given for the injectors which are pulsed (once per combustion event) for the length of time required to provide the required average flow rate. Examples are provided where the first two or three injectors are pulsed. In all cases, the sum of the steady state flow of the pulsing injectors is greater than the output of the next injector. Notably, the first injector is never allowed to output its full steady state output for the reason noted above where only 68.8% availability of the steady flow was available at 5200 rpm. However, all other pulsing injectors may be operated at 100% of their output, if required, by merely leaving them on all of the time.

The first TRUTH TABLE includes a column headed 'Overlap', which indicates the variation of flow at particular lines which may be obtained using the same injector or value configuration by varying the pulse width or the open time of the first injector.

| LINE NO | TOT FLOW min max | #1 88 | #2 88 | #3 110 | #4 220 | #5 440 | #6 900 | #7 900 | OVER LAP | OUTPUT - % F.S. No of Injectors 7 | 6 | 5 |
| --- | --- | --- | --- | --- | --- | --- | --- | --- | --- | --- | --- | --- |
| 1 | 0–61 | 0–61 | | | | | | | | | | |
| 2 | 62–116 | 31–58 | 31–58 | | | | | | | | | |
| 3 | 117–168 | 29–80 | 88–88 | | | | | | | | | |
| 4 | 169–171 | 59–61 | | 110 | | L2S4.5 Qmax=2746 Clsg=23 | | | 34.9% | 6% | 9% | 18% |
| 5 | 172–226 | 31–58 | 31–58 | 110 | | | | | | 6% | 9% | 18% |
| 6 | 227–278 | 29–80 | 88–88 | 110 | | | | | | 8% | 12% | 24% |
| 7 | 279–281 | 59–61 | | | 220 | | | | 21.1% | 10% | 15% | 29% |
| 8 | 282–336 | 31–58 | 31–58 | | 220 | | | | | 10% | 15% | 30% |
| 9 | 337–388 | 29–80 | 88–88 | | 220 | | | | | 12% | 18% | 36% |
| 10 | 389–391 | 59–61 | | 110 | 220 | | | | 15.2% | 14% | 21% | 41% |
| 11 | 392–446 | 31–58 | 31–58 | 110 | 220 | | | | | 14% | 21% | 41% |
| 12 | 447–498 | 29–80 | 88–88 | 110 | 220 | | | | | 16% | 24% | 47% |

-continued
| LINE NO | TOT FLOW min max | #1 88 | #2 88 | #3 110 | #4 220 | #5 440 | #6 900 | #7 900 | OVER LAP | OUTPUT - % F.S. No of Injectors 7 | 6 | 5 |
|---|---|---|---|---|---|---|---|---|---|---|---|---|
| 13 | 499-501 | 59-61 | | | | 440 | | | 11.8% | 18% | 27% | 53% |
| 14 | 502-556 | 31-58 | 31-58 | | | 440 | | | | 18% | 27% | 53% |
| 15 | 557-608 | 29-80 | 88-88 | | | 440 | | | | 20% | 30% | 59% |
| 16 | 609-611 | 59-61 | | 110 | | 440 | | | 9.7% | 22% | 33% | 64% |
| 17 | 612-666 | 31-58 | 31-58 | 110 | | 440 | | | | 22% | 33% | 65% |
| 18 | 667-718 | 29-80 | 88-88 | 110 | | 440 | | | | 24% | 36% | 71% |
| 19 | 719-721 | 59-61 | | | 220 | 440 | | | 8.2% | 26% | 39% | 76% |
| 20 | 722-776 | 31-58 | 31-58 | | 220 | 440 | | | | 26% | 39% | 76% |
| 21 | 777-828 | 29-80 | 88-88 | | 220 | 440 | | | | 28% | 42% | 82% |
| 22 | 829-831 | 59-61 | | 110 | 220 | 440 | | | 7.1% | 30% | 45% | 88% |
| 23 | 832-886 | 31-58 | 31-58 | 110 | 220 | 440 | | | | 30% | 45% | |
| 24 | 887-938 | 29-80 | 88-88 | 110 | 220 | 440 | | | | 32% | 48% | |
| 25 | 939-961 | 39-61 | | | | | 900 | | 4.2% | 34% | 51% | |
| 26 | 962-1016 | 31-58 | 31-58 | | | | 900 | | | 35% | 52% | |
| 27 | 1017-1068 | 29-80 | 88-88 | | | | 900 | | | 37% | 55% | |
| 28 | 1069-1071 | 59-61 | | 110 | | | 900 | | 5.5% | 39% | 58% | |
| 29 | 1072-1126 | 31-58 | 31-58 | 110 | | | 900 | | | 39% | 58% | |
| 30 | 1127-1178 | 29-80 | 88-88 | 110 | | | 900 | | | 41% | 61% | |
| 31 | 1179-1181 | 59-61 | | | 220 | | 900 | | 5.0% | 43% | 64% | |
| 32 | 1182-1236 | 31-58 | 31-58 | | 220 | | 900 | | | 43% | 64% | |
| 33 | 1237-1288 | 29-80 | 88-88 | | 220 | | 900 | | | 45% | 67% | |
| 34 | 1289-1291 | 59-61 | | 110 | 220 | | 900 | | 4.6% | 47% | 70% | |
| 35 | 1292-1346 | 31-58 | 31-58 | 110 | 220 | | 900 | | | 47% | 70% | |
| 36 | 1347-1398 | 29-80 | 88-88 | 110 | 220 | | 900 | | | 49% | 73% | |
| 37 | 1399-1401 | 59-61 | | | | 440 | 900 | | 4.2% | 51% | 76% | |
| 38 | 1402-1456 | 31-58 | 31-58 | | | 440 | 900 | | | 51% | 76% | |
| 39 | 1457-1508 | 29-80 | 88-88 | | | 440 | 900 | | | 53% | 79% | |
| 40 | 1509-1511 | 59-61 | | 110 | | 440 | 900 | | 3.9% | 55% | 82% | |
| 41 | 1512-1566 | 31-58 | 31-58 | 110 | | 440 | 900 | | | 55% | 82% | |
| 42 | 1567-1618 | 29-80 | 88-88 | 110 | | 440 | 900 | | | 57% | 85% | |
| 43 | 1619-1621 | 59-61 | | | 220 | 440 | 900 | | 3.6% | 59% | 88% | |
| 44 | 1622-1676 | 31-58 | 31-58 | | 220 | 440 | 900 | | | 59% | 88% | |
| 45 | 1677-1728 | 29-80 | 88-88 | | 220 | 440 | 900 | | | 61% | 91% | |
| 46 | 1729-1731 | 59-61 | | 110 | 220 | 440 | 900 | | 3.4% | 63% | 94% | |
| 47 | 1732-1786 | 31-58 | 31-58 | 110 | 220 | 440 | 900 | | | 63% | 94% | |
| 48 | 1787-1838 | 29-80 | 88-88 | 110 | 220 | 440 | 900 | | | 65% | 97% | |
| 49 | 1839-1861 | 39-61 | | | | | 900 | 900 | 2.1% | 67% | | |
| 50 | 1862-1916 | 31-58 | 31-58 | | | | 900 | 900 | | 68% | | |
| 51 | 1917-1968 | 29-80 | 88-88 | | | | 900 | 900 | | 70% | | |
| 52 | 1969-1971 | 59-61 | | 110 | | | 900 | 900 | 3.0% | 72% | | |
| 53 | 1972-2026 | 31-58 | 31-58 | 110 | | | 900 | 900 | | 72% | | |
| 54 | 2027-2078 | 29-80 | 88-88 | 110 | | | 900 | 900 | | 74% | | |
| 55 | 2079-2081 | 59-61 | | | 220 | | 900 | 900 | 2.8% | 76% | | |
| 56 | 2082-2136 | 31-58 | 31-58 | | 220 | | 900 | 900 | | 76% | | |
| 57 | 2137-2188 | 29-80 | 88-88 | | 220 | | 900 | 900 | | 78% | | |
| 58 | 2189-2191 | 59-61 | | 110 | 220 | | 900 | 900 | 2.7% | 80% | | |
| 59 | 2192-2246 | 31-58 | 31-58 | 110 | 220 | | 900 | 900 | | 80% | | |
| 60 | 2247-2298 | 29-80 | 88-88 | 110 | 220 | | 900 | 900 | | 82% | | |
| 61 | 2299-2301 | 59-61 | | | | 440 | 900 | 900 | 2.6% | 84% | | |
| 62 | 2302-2356 | 31-58 | 31-58 | | | 440 | 900 | 900 | | 84% | | |
| 63 | 2357-2408 | 29-80 | 88-88 | | | 440 | 900 | 900 | | 86% | | |
| 64 | 2409-2411 | 59-61 | | 110 | | 440 | 900 | 900 | 2.4% | 88% | | |
| 65 | 2412-2466 | 31-58 | 31-58 | 110 | | 440 | 900 | 900 | | 88% | | |
| 66 | 2467-2518 | 29-80 | 88-88 | 110 | | 440 | 900 | 900 | | 90% | | |
| 67 | 2519-2521 | 59-61 | | | 220 | 440 | 900 | 900 | 2.3% | 92% | | |
| 68 | 2522-2576 | 31-58 | 31-58 | | 220 | 440 | 900 | 900 | | 92% | | |
| 69 | 2577-2628 | 29-80 | 88-88 | | 220 | 440 | 900 | 900 | | 94% | | |
| 70 | 2629-2631 | 59-61 | | 110 | 220 | 440 | 900 | 900 | 2.2% | 96% | | |
| 71 | 2632-2686 | 31-58 | 31-58 | 110 | 220 | 440 | 900 | 900 | | 96% | | |
| 72 | 2687-2746 | 29-88 | 88-88 | 110 | 220 | 440 | 900 | 900 | | 98% | | |
INJECTOR TRUTH TABLE
 CONFIGURATION, 8 INJECTORS, 3 PULSING
| LINE NO | TOTAL FLOW (SCFH) min max | #1 59 | #2 64 | #3 64 | #4 150 | #5 300 | #6 600 | #7 900 | #8 900 |
|---|---|---|---|---|---|---|---|---|---|
| 1 | 0-59 | 0-59 | | | | | | | |
| 2 | 60-91 | 28-59 | 32 | | | | | | |
| 3 | 92-123 | 28-59 | 64 | | | | | | |
| 4 | 124-155 | 28-59 | 64 | 32 | | | | | |
| 5 | 156-187 | 28-59 | 64 | 64 | | | | | |

INJECTOR TRUTH TABLE-continued

| # | Range | C1 | C2 | C3 | C4 | C5 | C6 | C7 | C8 |
|---|---|---|---|---|---|---|---|---|---|
| 6 | 138–209 | 38–59 | | | 150 | | | | |
| 7 | 210–241 | 28–59 | 32 | | 150 | | | | |
| 8 | 242–273 | 28–59 | 64 | | 150 | | | | |
| 9 | 274–305 | 28–59 | 64 | 32 | 150 | | | | |
| 10 | 306–337 | 28–59 | 64 | 64 | 150 | | | | |
| 11 | 338–359 | 38–59 | | | | 300 | | | |
| 12 | 360–391 | 28–59 | 32 | | | 300 | | | |
| 13 | 392–423 | 28–59 | 64 | | | 300 | | | |
| 14 | 424–455 | 28–59 | 64 | 32 | | 300 | | | |
| 15 | 456–487 | 28–59 | 64 | 64 | | 300 | | | |
| 16 | 488–509 | 38–59 | | | 150 | 300 | | | |
| 17 | 510–541 | 28–59 | 32 | | 150 | 300 | | | |
| 18 | 542–573 | 28–59 | 64 | | 150 | 300 | | | |
| 19 | 574–605 | 28–59 | 64 | 32 | 150 | 300 | | | |
| 20 | 606–637 | 28–59 | 64 | 64 | 150 | 300 | | | |
| 21 | 638–659 | 38–59 | | | | | 600 | | |
| 22 | 660–691 | 28–59 | 32 | | | | 600 | | |
| 23 | 692–723 | 28–59 | 64 | | | | 600 | | |
| 24 | 724–755 | 28–59 | 64 | 32 | | | 600 | | |
| 25 | 756–787 | 28–59 | 64 | 64 | | | 600 | | |
| 26 | 788–809 | 38–59 | | | 150 | | 600 | | |
| 27 | 810–841 | 28–59 | 32 | | 150 | | 600 | | |
| 28 | 842–873 | 28–59 | 64 | | 150 | | 600 | | |
| 29 | 874–905 | 28–59 | 64 | 32 | 150 | | 600 | | |
| 30 | 906–937 | 28–59 | 64 | 64 | 150 | | 600 | | |
| 31 | 938–959 | 38–59 | | | | | | 900 | |
| 32 | 960–991 | 28–59 | 32 | | | | | 900 | |
| 33 | 992–1023 | 28–59 | 64 | | | | | 900 | |
| 34 | 1024–1055 | 28–59 | 64 | 32 | | | | 900 | |
| 35 | 1056–1087 | 28–59 | 64 | 64 | | | | 900 | |
| 36 | 1088–1109 | 38–59 | | | 150 | | | 900 | |
| 37 | 1110–1141 | 28–59 | 32 | | 150 | | | 900 | |
| 38 | 1142–1173 | 28–59 | 64 | | 150 | | | 900 | |
| 39 | 1174–1205 | 28–59 | 64 | 32 | 150 | | | 900 | |
| 40 | 1206–1237 | 28–59 | 64 | 64 | 150 | | | 900 | |
| 41 | 1238–1259 | 38–59 | | | | 300 | | 900 | |
| 42 | 1260–1291 | 28–59 | 32 | | | 300 | | 900 | |
| 43 | 1292–1323 | 28–59 | 64 | | | 300 | | 900 | |
| 44 | 1324–1355 | 28–59 | 64 | 32 | | 300 | | 900 | |
| 45 | 1356–1387 | 28–59 | 64 | 64 | | 300 | | 900 | |
| 46 | 1388–1409 | 38–59 | | | 150 | 300 | | 900 | |
| 47 | 1410–1441 | 28–59 | 32 | | 150 | 300 | | 900 | |
| 48 | 1442–1473 | 28–59 | 64 | | 150 | 300 | | 900 | |
| 49 | 1474–1505 | 28–59 | 64 | 32 | 150 | 300 | | 900 | |
| 50 | 1506–1537 | 28–59 | 64 | 64 | 150 | 300 | | 900 | |
| 51 | 1538–1559 | 38–59 | | | | | 600 | 900 | |
| 52 | 1560–1591 | 28–59 | 32 | | | | 600 | 900 | |
| 53 | 1592–1623 | 28–59 | 64 | | | | 600 | 900 | |
| 54 | 1624–1655 | 28–59 | 64 | 32 | | | 600 | 900 | |
| 55 | 1656–1687 | 28–59 | 64 | 64 | | | 600 | 900 | |
| 56 | 1688–1709 | 38–59 | | | 150 | | 600 | 900 | |
| 57 | 1710–1741 | 28–59 | 32 | | 150 | | 600 | 900 | |
| 58 | 1742–1773 | 28–59 | 64 | | 150 | | 600 | 900 | |
| 59 | 1774–1805 | 28–59 | 64 | 32 | 150 | | 600 | 900 | |
| 60 | 1806–1837 | 28–59 | 64 | 64 | 150 | | 600 | 900 | |
| 61 | 1838–1859 | 38–59 | | | | | | 900 | 900 |
| 62 | 1860–1891 | 28–59 | 32 | | | | | 900 | 900 |
| 63 | 1892–1923 | 28–59 | 64 | | | | | 900 | 900 |
| 64 | 1924–1955 | 28–59 | 64 | 32 | | | | 900 | 900 |
| 65 | 1956–1987 | 28–59 | 64 | 64 | | | | 900 | 900 |
| 66 | 1988–2009 | 38–59 | | | 150 | | | 900 | 900 |
| 67 | 2010–2041 | 28–59 | 32 | | 150 | | | 900 | 900 |
| 68 | 2042–2073 | 28–59 | 64 | | 150 | | | 900 | 900 |
| 69 | 2074–2105 | 28–59 | 64 | 32 | 150 | | | 900 | 900 |
| 70 | 2106–2137 | 28–59 | 64 | 64 | 150 | | | 900 | 900 |
| 71 | 2138–2159 | 38–59 | | | | 300 | | 900 | 900 |
| 72 | 2160–2191 | 28–59 | 32 | | | 300 | | 900 | 900 |
| 73 | 2192–2223 | 28–59 | 64 | | | 300 | | 900 | 900 |
| 74 | 2224–2255 | 28–59 | 64 | 32 | | 300 | | 900 | 900 |
| 75 | 2256–2287 | 28–59 | 64 | 64 | | 300 | | 900 | 900 |
| 76 | 2288–2309 | 38–59 | | | 150 | 300 | | 900 | 900 |
| 77 | 2310–2341 | 28–59 | 32 | | 150 | 300 | | 900 | 900 |
| 78 | 2342–2373 | 28–59 | 64 | | 150 | 300 | | 900 | 900 |
| 79 | 2374–2405 | 28–59 | 64 | 32 | 150 | 300 | | 900 | 900 |
| 80 | 2406–2437 | 28–59 | 64 | 64 | 150 | 300 | | 900 | 900 |
| 81 | 2438–2459 | 38–59 | | | | | 600 | 900 | 900 |
| 82 | 2460–2491 | 28–59 | 32 | | | | 600 | 900 | 900 |
| 83 | 2492–2523 | 28–59 | 64 | | | | 600 | 900 | 900 |
| 84 | 2524–2555 | 28–59 | 64 | 32 | | | 600 | 900 | 900 |
| 85 | 2556–2587 | 28–59 | 64 | 64 | | | 600 | 900 | 900 |
| 86 | 2588–2609 | 38–59 | | | 150 | | 600 | 900 | 900 |
| 87 | 2610–2641 | 28–59 | 32 | | 150 | | 600 | 900 | 900 |

INJECTOR TRUTH TABLE-continued
| | | | | | | | | | |
|---|---|---|---|---|---|---|---|---|---|
| 88 | 2642–2673 | 28–59 | 64 | | 150 | | 600 | 900 | 900 |
| 89 | 2674–2705 | 28–59 | 64 | 32 | 150 | | 600 | 900 | 900 |
| 90 | 2706–2737 | 28–59 | 64 | 64 | 150 | | 600 | 900 | 900 |
| 91 | 2738–2759 | 38–59 | | | | 300 | 600 | 900 | 900 |
| 92 | 2760–2791 | 28–59 | 32 | | | 300 | 600 | 900 | 900 |
| 93 | 2792–2823 | 28–59 | 64 | | | 300 | 600 | 900 | 900 |
| 94 | 2824–2855 | 28–59 | 64 | 32 | | 300 | 600 | 900 | 900 |
| 95 | 2856–2887 | 28–59 | 64 | 64 | | 300 | 600 | 900 | 900 |
| 96 | 2888–2909 | 38–59 | | | 150 | 300 | 600 | 900 | 900 |
| 97 | 2910–2941 | 28–59 | 32 | | 150 | 300 | 600 | 900 | 900 |
| 98 | 2942–2973 | 28–59 | 64 | | 150 | 300 | 600 | 900 | 900 |
| 99 | 2974–3005 | 28–59 | 64 | 32 | 150 | 300 | 600 | 900 | 900 |
| 100 | 3006–3037 | 28–59 | 64 | 64 | 150 | 300 | 600 | 900 | 900 |
 L2S CONFIGURATION, 7 INJECTORS. 2 PULSING
| | TOTAL FLOW | OUTPUT FLOW USED FROM EACH INJECTOR | | | | | | |
|---|---|---|---|---|---|---|---|---|
| LINE | (SCFH) | #1 | #2 | #3 | #4 | #5 | #6 | #7 |
| NO | min max | 90 | 97 | 150 | 300 | 600 | 900 | 900 |
| 1 | 0–90 | 0–90 | | | | | | |
| 2 | 91–138 | 43–90 | 48 | | | | | |
| 3 | 139–187 | 42–90 | 97 | | | | | |
| 4 | 188–240 | 38–90 | | 150 | | | | |
| 5 | 241–288 | 43–90 | 48 | 150 | | | | |
| 6 | 289–337 | 42–90 | 97 | 150 | | | | |
| 7 | 338–390 | 38–90 | | | 300 | | | |
| 8 | 391–438 | 43–90 | 48 | | 300 | | | |
| 9 | 439–487 | 42–90 | 97 | | 300 | | | |
| 10 | 488–540 | 38–90 | | 150 | 300 | | | |
| 11 | 541–588 | 43–90 | 48 | 150 | 300 | | | |
| 12 | 589–637 | 42–90 | 97 | 150 | 300 | | | |
| 13 | 638–690 | 38–90 | | | | 600 | | |
| 14 | 691–738 | 43–90 | 48 | | | 600 | | |
| 15 | 739–787 | 42–90 | 97 | | | 600 | | |
| 16 | 788–840 | 38–90 | | 150 | | 600 | | |
| 17 | 841–888 | 43–90 | 48 | 150 | | 600 | | |
| 18 | 889–937 | 42–90 | 97 | 150 | | 600 | | |
| 19 | 938–990 | 38–90 | | | | | 900 | |
| 20 | 991–1038 | 43–90 | 48 | | | | 900 | |
| 21 | 1039–1087 | 42–90 | 97 | | | | 900 | |
| 22 | 1088–1140 | 38–90 | | 150 | | | 900 | |
| 23 | 1141–1188 | 43–90 | 48 | 150 | | | 900 | |
| 24 | 1189–1237 | 42–90 | 97 | 150 | | | 900 | |
| 25 | 1238–1290 | 38–90 | | | 300 | | 900 | |
| 26 | 1291–1338 | 43–90 | 48 | | 300 | | 900 | |
| 27 | 1339–1387 | 42–90 | 97 | | 300 | | 900 | |
| 28 | 1388–1440 | 38–90 | | 150 | 300 | | 900 | |
| 29 | 1441–1488 | 43–90 | 48 | 150 | 300 | | 900 | |
| 30 | 1489–1537 | 42–90 | 97 | 150 | 300 | | 900 | |
| 31 | 1538–1590 | 38–90 | | | | 600 | 900 | |
| 32 | 1591–1638 | 43–90 | 48 | | | 600 | 900 | |
| 33 | 1639–1687 | 42–90 | 97 | | | 600 | 900 | |
| 34 | 1688–1740 | 38–90 | | 150 | | 600 | 900 | |
| 35 | 1741–1788 | 43–90 | 48 | 150 | | 600 | 900 | |
| 36 | 1789–1837 | 42–90 | 97 | 150 | | 600 | 900 | |
| 37 | 1838–1890 | 38–90 | | | | | 900 | 900 |
| 38 | 1891–1938 | 43–90 | 48 | | | | 900 | 900 |
| 39 | 1939–1987 | 42–90 | 97 | | | | 900 | 900 |
| 40 | 1988–2040 | 38–90 | | 150 | | | 900 | 900 |
| 41 | 2041–2088 | 43–90 | 48 | 150 | | | 900 | 900 |
| 42 | 2089–2137 | 42–90 | 97 | 150 | | | 900 | 900 |
| 43 | 2138–2190 | 38–90 | | | 300 | | 900 | 900 |
| 44 | 2191–2238 | 43–90 | 48 | | 300 | | 900 | 900 |
| 45 | 2239–2287 | 42–90 | 97 | | 300 | | 900 | 900 |
| 46 | 2288–2340 | 38–90 | | 150 | 300 | | 900 | 900 |
| 47 | 2341–2388 | 43–90 | 48 | 150 | 300 | | 900 | 900 |
| 48 | 2389–2437 | 42–90 | 97 | 150 | 300 | | 900 | 900 |
| 49 | 2438–2490 | 38–90 | | | | 600 | 900 | 900 |
| 50 | 2491–2538 | 43–90 | 48 | | | 600 | 900 | 900 |
| 51 | 2539–2587 | 42–90 | 97 | | | 600 | 900 | 900 |
| 52 | 2588–2640 | 38–90 | | 150 | | 600 | 900 | 900 |
| 53 | 2641–2688 | 43–90 | 48 | 150 | | 600 | 900 | 900 |
| 54 | 2689–2737 | 42–90 | 97 | 150 | | 600 | 900 | 900 |
| 55 | 2738–2790 | 38–90 | | | 300 | 600 | 900 | 900 |
| 56 | 2791–2838 | 43–90 | 48 | | 300 | 600 | 900 | 900 |
| 57 | 2839–2887 | 42–90 | 97 | | 300 | 600 | 900 | 900 |
| 58 | 2888–2940 | 38–90 | | 150 | 300 | 600 | 900 | 900 |
| 59 | 2941–2988 | 43–90 | 48 | 150 | 300 | 600 | 900 | 900 |

INJECTOR TRUTH TABLE-continued
| 60 | 2989-3037 | 42-90 | 97 | 150 | 300 | 600 | 900 | 900 |
 L2S CONFIGURATION. 8 INJECTORS, 2 PULSING
| LINE NO | TOTAL FLOW (SCFH) min max | #1 53 | #2 58 | #3 75 | #4 150 | #5 300 | #6 600 | #7 900 | #8 900 |
|---|---|---|---|---|---|---|---|---|---|
| 1 | 0-53 | 0-53 | | | | | | | |
| 2 | 54-82 | 25-53 | 29 | | | | | | |
| 3 | 83-111 | 25-53 | 58 | | | | | | |
| 4 | 112-128 | 37-53 | | 75 | | | | | |
| 5 | 129-157 | 25-53 | 29 | 75 | | | | | |
| 6 | 158-186 | 25-53 | 58 | 75 | | | | | |
| 7 | 187-203 | 37-53 | | | 150 | | | | |
| 8 | 204-232 | 25-53 | 29 | | 150 | | | | |
| 9 | 233-261 | 25-53 | 58 | | 150 | | | | |
| 10 | 262-278 | 37-53 | | 75 | 150 | | | | |
| 11 | 279-307 | 25-53 | 29 | 75 | 150 | | | | |
| 12 | 308-336 | 25-53 | 58 | 75 | 150 | | | | |
| 13 | 337-353 | 37-53 | | | | 300 | | | |
| 14 | 354-382 | 25-53 | 29 | | | 300 | | | |
| 15 | 383-411 | 25-53 | 58 | | | 300 | | | |
| 16 | 412-428 | 37-53 | | 75 | | 300 | | | |
| 17 | 429-457 | 25-53 | 29 | 75 | | 300 | | | |
| 18 | 458-486 | 25-53 | 58 | 75 | | 300 | | | |
| 19 | 487-503 | 37-53 | | | 150 | 300 | | | |
| 20 | 504-532 | 25-53 | 29 | | 150 | 300 | | | |
| 21 | 533-561 | 25-53 | 58 | | 150 | 300 | | | |
| 22 | 562-578 | 37-53 | | 75 | 150 | 300 | | | |
| 23 | 579-607 | 25-53 | 29 | 75 | 150 | 300 | | | |
| 24 | 608-636 | 25-53 | 58 | 75 | 150 | 300 | | | |
| 25 | 637-653 | 37-53 | | | | | 600 | | |
| 26 | 654-682 | 25-53 | 29 | | | | 600 | | |
| 27 | 683-711 | 25-53 | 58 | | | | 600 | | |
| 28 | 712-728 | 37-53 | | 75 | | | ·600 | | |
| 29 | 729-757 | 25-53 | 29 | 75 | | | 600 | | |
| 30 | 758-786 | 25-53 | 58 | 75 | | | 600 | | |
| 31 | 787-803 | 37-53 | | | 150 | | 600 | | |
| 32 | 804-832 | 25-53 | 29 | | 150 | | 600 | | |
| 33 | 833-861 | 25-53 | 58 | | 150 | | 600 | | |
| 34 | 862-878 | 37-53 | | 75 | 150 | | 600 | | |
| 35 | 879-907 | 25-53 | 29 | 75 | 150 | | 600 | | |
| 36 | 908-936 | 25-53 | 58 | 75 | 150 | | 600 | | |
| 37 | 937-953 | 37-53 | | | | | | 900 | |
| 38 | 954-982 | 25-53 | 29 | | | | | 900 | |
| 39 | 983-1011 | 25-53 | 58 | | | | | 900 | |
| 40 | 1012-1028 | 37-53 | | 75 | | | | 900 | |
| 41 | 1029-1057 | 25-53 | 29 | 75 | | | | 900 | |
| 42 | 1058-1086 | 25-53 | 58 | 75 | | | | 900 | |
| 43 | 1087-1103 | 37-53 | | | 150 | | | 900 | |
| 44 | 1104-1132 | 25-53 | 29 | | 150 | | | 900 | |
| 45 | 1133-1161 | 25-53 | 58 | | 150 | | | 900 | |
| 46 | 1162-1178 | 37-53 | | 75 | 150 | | | 900 | |
| 47 | 1179-1207 | 25-53 | 29 | 75 | 150 | | | 900 | |
| 48 | 1208-1236 | 25-53 | 58 | 75 | 150 | | | 900 | |
| 49 | 1237-1253 | 37-53 | | | | 300 | | 900 | |
| 50 | 1254-1282 | 25-53 | 29 | | | 300 | | 900 | |
| 51 | 1283-1311 | 25-53 | 58 | | | 300 | | 900 | |
| 52 | 1312-1328 | 37-53 | | 75 | | 300 | | 900 | |
| 53 | 1329-1357 | 25-53 | 29 | 75 | | 300 | | 900 | |
| 54 | 1358-1386 | 25-53 | 58 | 75 | | 300 | | 900 | |
| 55 | 1387-1403 | 37-53 | | | 150 | 300 | | 900 | |
| 56 | 1404-1432 | 25-53 | 29 | | 150 | 300 | | 900 | |
| 57 | 1433-1461 | 25-53 | 58 | | 150 | 300 | | 900 | |
| 58 | 1462-1478 | 37-53 | | 75 | 150 | 300 | | 900 | |
| 59 | 1479-1507 | 25-53 | 29 | 75 | 150 | 300 | | 900 | |
| 60 | 1508-1536 | 25-53 | 58 | 75 | 150 | 300 | | 900 | |
| 61 | 1537-1553 | 37-53 | | | | | 600 | 900 | |
| 62 | 1554-1582 | 25-53 | 29 | | | | 600 | 900 | |
| 63 | 1583-1611 | 25-53 | 58 | | | | 600 | 900 | |
| 64 | 1612-1628 | 37-53 | | 75 | | | 600 | 900 | |
| 65 | 1629-1657 | 25-53 | 29 | 75 | | | 600 | 900 | |
| 66 | 1658-1686 | 25-53 | 58 | 75 | | | 600 | 900 | |
| 67 | 1687-1703 | 37-53 | | | 150 | | 600 | 900 | |
| 68 | 1704-1732 | 25-53 | 29 | | 150 | | 600 | 900 | |
| 69 | 1733-1761 | 25-53 | 58 | | 150 | | 600 | 900 | |
| 70 | 1762-1778 | 37-53 | | 75 | 150 | | 600 | 900 | |
| 71 | 1779-1807 | 25-53 | 29 | 75 | 150 | | 600 | 900 | |

INJECTOR TRUTH TABLE-continued

| | | | | | | | | |
|---|---|---|---|---|---|---|---|---|
| 72 | 1808–1836 | 25–53 | 58 | 75 | 150 | | 600 | 900 |
| 73 | 1837–1853 | 37–53 | | | | | 900 | 900 |
| 74 | 1854–1882 | 25–53 | 29 | | | | 900 | 900 |
| 75 | 1883–1911 | 25–53 | 58 | | | | 900 | 900 |
| 76 | 1912–1928 | 37–53 | | 75 | | | 900 | 900 |
| 77 | 1929–1957 | 25–53 | 29 | 75 | | | 900 | 900 |
| 78 | 1958–1986 | 25–53 | 58 | 75 | | | 900 | 900 |
| 79 | 1987–2003 | 37–53 | | | 150 | | 900 | 900 |
| 80 | 2004–2032 | 25–53 | 29 | | 150 | | 900 | 900 |
| 81 | 2033–2061 | 25–53 | 58 | | 150 | | 900 | 900 |
| 82 | 2062–2078 | 37–53 | | 75 | 150 | | 900 | 900 |
| 83 | 2079–2107 | 25–53 | 29 | 75 | 150 | | 900 | 900 |
| 84 | 2108–2136 | 25–53 | 58 | 75 | 150 | | 900 | 900 |
| 85 | 2137–2153 | 37–53 | | | | 300 | 900 | 900 |
| 86 | 2154–2182 | 25–53 | 29 | | | 300 | 900 | 900 |
| 87 | 2183–2211 | 25–53 | 58 | | | 300 | 900 | 900 |
| 88 | 2212–2228 | 37–53 | | 75 | | 300 | 900 | 900 |
| 89 | 2229–2257 | 25–53 | 29 | 75 | | 300 | 900 | 900 |
| 90 | 2258–2286 | 25–53 | 58 | 75 | | 300 | 900 | 900 |
| 91 | 2287–2303 | 37–53 | | | 150 | 300 | 900 | 900 |
| 92 | 2304–2332 | 25–53 | 29 | | 150 | 300 | 900 | 900 |
| 93 | 2333–2361 | 25–53 | 58 | | 150 | 300 | 900 | 900 |
| 94 | 2362–2378 | 37–53 | | 75 | 150 | 300 | 900 | 900 |
| 95 | 2379–2407 | 25–53 | 29 | 75 | 150 | 300 | 900 | 900 |
| 96 | 2408–2436 | 25–53 | 58 | 75 | 150 | 300 | 900 | 900 |
| 97 | 2437–2453 | 37–53 | | | | | 600 | 900 | 900 |
| 98 | 2454–2482 | 25–53 | 29 | | | | 600 | 900 | 900 |
| 99 | 2483–2511 | 25–53 | 58 | | | | 600 | 900 | 900 |
| 100 | 2512–2528 | 37–53 | | 75 | | | 600 | 900 | 900 |
| 101 | 2529–2557 | 25–53 | 29 | 75 | | | 600 | 900 | 900 |
| 102 | 2558–2586 | 25–53 | 58 | 75 | | | 600 | 900 | 900 |
| 103 | 2587–2603 | 37–53 | | | 150 | | 600 | 900 | 900 |
| 104 | 2604–2632 | 25–53 | 29 | | 150 | | 600 | 900 | 900 |
| 105 | 2633–2661 | 25–53 | 58 | | 150 | | 600 | 900 | 900 |
| 106 | 2662–2678 | 37–53 | | 75 | 150 | | 600 | 900 | 900 |
| 107 | 2679–2707 | 25–53 | 29 | 75 | 150 | | 600 | 900 | 900 |
| 108 | 2708–2736 | 25–53 | 58 | 75 | 150 | | 600 | 900 | 900 |
| 109 | 2737–2753 | 37–53 | | | | 300 | 600 | 900 | 900 |
| 110 | 2754–2782 | 25–53 | 29 | | | 300 | 600 | 900 | 900 |
| 111 | 2783–2811 | 25–53 | 58 | | | 300 | 600 | 900 | 900 |
| 112 | 2812–2828 | 37–53 | | 75 | | 300 | 600 | 900 | 900 |
| 113 | 2829–2857 | 25–53 | 29 | 75 | | 300 | 600 | 900 | 900 |
| 114 | 2858–2886 | 25–53 | 58 | 75 | | 300 | 600 | 900 | 900 |
| 115 | 2887–2903 | 37–53 | | | 150 | 300 | 600 | 900 | 900 |
| 116 | 2904–2932 | 25–53 | 29 | | 150 | 300 | 600 | 900 | 900 |
| 117 | 2933–2961 | 25–53 | 58 | | 150 | 300 | 600 | 900 | 900 |
| 118 | 2962–2978 | 37–53 | | 75 | 150 | 300 | 600 | 900 | 900 |
| 119 | 2979–3007 | 25–53 | 29 | 75 | 150 | 300 | 600 | 900 | 900 |
| 120 | 3008–3036 | 25–53 | 58 | 75 | 150 | 300 | 600 | 900 | 900 |

L2E CONFIGURATION, 7 INJECTORS, 2 PULSING

| LINE NO | TOTAL FLOW (SCFH) min max | OUTPUT FLOW USED FROM EACH INJECTOR | | | | | | |
|---|---|---|---|---|---|---|---|---|
| | | #1 80 | #2 86 | #3 125 | #4 250 | #5 500 | #6 1000 | #7 1000 |
| 1 | 0–80 | 0–80 | | | | | | |
| 2 | 81–123 | 38–80 | 43 | | | | | |
| 3 | 124–166 | 38–80 | 86 | | | | | |
| 4 | 167–205 | 42–80 | | 125 | | | | |
| 5 | 206–248 | 38–80 | 43 | 125 | | | | |
| 6 | 249–291 | 38–80 | 86 | 125 | | | | |
| 7 | 292–330 | 42–80 | | | 250 | | | |
| 8 | 331–373 | 38–80 | 43 | | 250 | | | |
| 9 | 374–416 | 38–80 | 86 | | 250 | | | |
| 10 | 417–455 | 42–80 | | 125 | 250 | | | |
| 11 | 456–498 | 38–80 | 43 | 125 | 250 | | | |
| 12 | 499–541 | 38–80 | 86 | 125 | 250 | | | |
| 13 | 542–580 | 42–80 | | | | 500 | | |
| 14 | 581–623 | 38–80 | 43 | | | 500 | | |
| 15 | 624–666 | 38–80 | 86 | | | 500 | | |
| 16 | 667–705 | 42–80 | | 125 | | 500 | | |
| 17 | 706–748 | 38–80 | 43 | 125 | | 500 | | |
| 18 | 749–791 | 38–80 | 86 | 125 | | 500 | | |
| 19 | 792–830 | 42–80 | | | 250 | 500 | | |
| 20 | 831–873 | 38–80 | 43 | | 250 | 500 | | |
| 21 | 874–916 | 38–80 | 86 | | 250 | 500 | | |
| 22 | 917–955 | 42–80 | | 125 | 250 | 500 | | |
| 23 | 956–998 | 38–80 | 43 | 125 | 250 | 500 | | |

INJECTOR TRUTH TABLE-continued
| | | | | | | | | |
|---|---|---|---|---|---|---|---|---|
| 24 | 999–1041 | 38–80 | 86 | 125 | 250 | 500 | | |
| 25 | 1042–1080 | 42–80 | | | | | 1000 | |
| 26 | 1081–1123 | 38–80 | 43 | | | | 1000 | |
| 27 | 1124–1166 | 38–80 | 86 | | | | 1000 | |
| 28 | 1167–1205 | 42–80 | | 125 | | | 1000 | |
| 29 | 1206–1248 | 38–80 | 43 | 125 | | | 1000 | |
| 30 | 1249–1291 | 38–80 | 86 | 125 | | | 1000 | |
| 31 | 1292–1330 | 42–80 | | | 250 | | 1000 | |
| 32 | 1331–1373 | 38–80 | 43 | | 250 | | 1000 | |
| 33 | 1374–1416 | 38–80 | 86 | | 250 | | 1000 | |
| 34 | 1417–1455 | 42–80 | | 125 | 250 | | 1000 | |
| 35 | 1456–1498 | 38–80 | 43 | 125 | 250 | | 1000 | |
| 36 | 1499–1541 | 38–80 | 86 | 125 | 250 | | 1000 | |
| 37 | 1542–1580 | 42–80 | | | | 500 | 1000 | |
| 38 | 1581–1623 | 38–80 | 43 | | | 500 | 1000 | |
| 39 | 1624–1666 | 38–80 | 86 | | | 500 | 1000 | |
| 40 | 1667–1705 | 42–80 | | 125 | | 500 | 1000 | |
| 41 | 1706–1748 | 38–80 | 43 | 125 | | 500 | 1000 | |
| 42 | 1749–1791 | 38–80 | 86 | 125 | | 500 | 1000 | |
| 43 | 1792–1830 | 42–80 | | | 250 | 500 | 1000 | |
| 44 | 1831–1873 | 38–80 | 43 | | 250 | 500 | 1000 | |
| 45 | 1874–1916 | 38–80 | 86 | | 250 | 500 | 1000 | |
| 46 | 1917–1955 | 42–80 | | 125 | 250 | 500 | 1000 | |
| 47 | 1956–1998 | 38–80 | 43 | 125 | 250 | 500 | 1000 | |
| 48 | 1999–2041 | 38–80 | 86 | 125 | 250 | 500 | 1000 | |
| 49 | 2042–2080 | 42–80 | | | | | 1000 | 1000 |
| 50 | 2081–2123 | 38–80 | 43 | | | | 1000 | 1000 |
| 51 | 2124–2166 | 38–80 | 86 | | | | 1000 | 1000 |
| 52 | 2167–2205 | 42–80 | | 125 | | | 1000 | 1000 |
| 53 | 2206–2248 | 38–80 | 43 | 125 | | | 1000 | 1000 |
| 54 | 2249–2291 | 38–80 | 86 | 125 | | | 1000 | 1000 |
| 55 | 2292–2330 | 42–80 | | | 250 | | 1000 | 1000 |
| 56 | 2331–2373 | 38–80 | 43 | | 250 | | 1000 | 1000 |
| 57 | 2374–2416 | 38–80 | 86 | | 250 | | 1000 | 1000 |
| 58 | 2417–2455 | 42–80 | | 125 | 250 | | 1000 | 1000 |
| 59 | 2456–2498 | 38–80 | 43 | 125 | 250 | | 1000 | 1000 |
| 60 | 2499–2541 | 38–80 | 86 | 125 | 250 | | 1000 | 1000 |
| 61 | 2542–2580 | 42–80 | | | | 500 | 1000 | 1000 |
| 62 | 2581–2623 | 38–80 | 43 | | | 500 | 1000 | 1000 |
| 63 | 2624–2666 | 38–80 | 86 | | | 500 | 1000 | 1000 |
| 64 | 2667–2705 | 42–80 | | 125 | | 500 | 1000 | 1000 |
| 65 | 2706–2748 | 38–80 | 43 | 125 | | 500 | 1000 | 1000 |
| 66 | 2749–2791 | 38–80 | 86 | 125 | | 500 | 1000 | 1000 |
| 67 | 2792–2830 | 42–80 | | | 250 | 500 | 1000 | 1000 |
| 68 | 2831–2873 | 38–80 | 43 | | 250 | 500 | 1000 | 1000 |
| 69 | 2874–2916 | 38–80 | 86 | | 250 | 500 | 1000 | 1000 |
| 70 | 2917–2955 | 42–80 | | 125 | 250 | 500 | 1000 | 1000 |
| 71 | 2956–2998 | 38–80 | 43 | 125 | 250 | 500 | 1000 | 1000 |
| 72 | 2999–3041 | 38–80 | 86 | 125 | 250 | 500 | 1000 | 1000 |
 CONFIGURATION, 7 INJECTORS, 2 PULSING
| | TOTAL FLOW | OUTPUT FLOW USED FROM EACH INJECTOR | | | | | | |
|---|---|---|---|---|---|---|---|---|
| LINE NO | (SCFH) min  max | #1 74 | #2 80 | #3 94 | #4 188 | #5 375 | #6 750 | #7 1500 |
| 1 | 0–74 | 0–74 | | | | | | |
| 2 | 75–114 | 35–74 | 40 | | | | | |
| 3 | 115–168 | 21–74 | | 94 | | | | |
| 4 | 169–208 | 35–74 | 40 | 94 | | | | |
| 5 | 209–262 | 21–74 | | | 188 | | | |
| 6 | 263–302 | 35–74 | 40 | | 188 | | | |
| 7 | 303–356 | 21–74 | | 94 | 188 | | | |
| 8 | 357–396 | 35–74 | 40 | 94 | 188 | | | |
| 9 | 397–449 | 22–74 | | | | 375 | | |
| 10 | 450–489 | 35–74 | 40 | | | 375 | | |
| 11 | 490–543 | 21–74 | | 94 | | 375 | | |
| 12 | 544–583 | 35–74 | 40 | 94 | | 375 | | |
| 13 | 584–637 | 21–74 | | | 188 | 375 | | |
| 14 | 638–677 | 35–74 | 40 | | 188 | 375 | | |
| 15 | 678–731 | 21–74 | | 94 | 188 | 375 | | |
| 16 | 732–771 | 35–74 | 40 | 94 | 188 | 375 | | |
| 17 | 772–824 | 22–74 | | | | | 750 | |
| 18 | 825–864 | 35–74 | 40 | | | | 750 | |
| 19 | 865–918 | 21–74 | | 94 | | | 750 | |
| 20 | 919–958 | 35–74 | 40 | 94 | | | 750 | |
| 21 | 959–1012 | 21–74 | | | 188 | | 750 | |
| 22 | 1013–1052 | 35–74 | 40 | | 188 | | 750 | |
| 23 | 1053–1106 | 21–74 | | 94 | 188 | | 750 | |

INJECTOR TRUTH TABLE-continued

| | | | | | | | |
|---|---|---|---|---|---|---|---|
| 24 | 1107-1146 | 35-74 | 40 | 94 | 188 | | 750 |
| 25 | 1147-1199 | 22-74 | | | | 375 | 750 |
| 26 | 1200-1239 | 35-74 | 40 | | | 375 | 750 |
| 27 | 1240-1293 | 21-74 | | 94 | | 375 | 750 |
| 28 | 1294-1333 | 35-74 | 40 | 94 | | 375 | 750 |
| 29 | 1334-1387 | 21-74 | | | 188 | 375 | 750 |
| 30 | 1388-1427 | 35-74 | 40 | | 188 | 375 | 750 |
| 31 | 1428-1481 | 21-74 | | 94 | 188 | 375 | 750 |
| 32 | 1482-1521 | 35-74 | 40 | 94 | 188 | 375 | 750 |
| 33 | 1522-1574 | 22-74 | | | | | | 1500 |
| 34 | 1575-1614 | 35-74 | 40 | | | | | 1500 |
| 35 | 1615-1668 | 21-74 | | 94 | | | | 1500 |
| 36 | 1669-1708 | 35-74 | 40 | 94 | | | | 1500 |
| 37 | 1709-1762 | 21-74 | | | 188 | | | 1500 |
| 38 | 1763-1802 | 35-74 | 40 | | 188 | | | 1500 |
| 39 | 1803-1856 | 21-74 | | 94 | 188 | | | 1500 |
| 40 | 1857-1896 | 35-74 | 40 | 94 | 188 | | | 1500 |
| 41 | 1897-1949 | 22-74 | | | | 375 | | 1500 |
| 42 | 1950-1989 | 35-74 | 40 | | | 375 | | 1500 |
| 43 | 1990-2043 | 21-74 | | 94 | | 375 | | 1500 |
| 44 | 2044-2083 | 35-74 | 40 | 94 | | 375 | | 1500 |
| 45 | 2084-2137 | 21-74 | | | 188 | 375 | | 1500 |
| 46 | 2138-2177 | 35-74 | 40 | | 188 | 375 | | 1500 |
| 47 | 2178-2231 | 21-74 | | 94 | 188 | 375 | | 1500 |
| 48 | 2232-2271 | 35-74 | 40 | 90 | 188 | 375 | | 1500 |
| 49 | 2272-2324 | 22-74 | | | | | 750 | 1500 |
| 50 | 2325-2364 | 35-74 | 40 | | | | 750 | 1500 |
| 51 | 2365-2418 | 21-74 | | 94 | | | 750 | 1500 |
| 52 | 2419-2458 | 35-74 | 40 | 94 | | | 750 | 1500 |
| 53 | 2459-2512 | 21-74 | | | 188 | | 750 | 1500 |
| 54 | 2513-2552 | 35-74 | 40 | | 188 | | 750 | 1500 |
| 55 | 2553-2606 | 21-74 | | 94 | 188 | | 750 | 1500 |
| 56 | 2607-2646 | 35-74 | 40 | 94 | 188 | | 750 | 1500 |
| 57 | 2647-2699 | 22-74 | | | | 375 | 750 | 1500 |
| 58 | 2700-2739 | 35-74 | 40 | | | 375 | 750 | 1500 |
| 59 | 2740-2793 | 21-74 | | 94 | | 375 | 750 | 1500 |
| 60 | 2794-2833 | 35-74 | 40 | 94 | | 375 | 750 | 1500 |
| 61 | 2834-2887 | 21-74 | | | 188 | 375 | 750 | 1500 |
| 62 | 2888-2927 | 35-74 | 40 | | 188 | 375 | 750 | 1500 |
| 63 | 2928-2981 | 21-74 | | 94 | 188 | 375 | 750 | 1500 |
| 64 | 2982-3021 | 35-74 | 40 | 94 | 188 | 375 | 750 | 1500 |

To accurately control the flow of fuel it is necessary to have the variables included in equation (1) above to calculate the mass flow of fuel through each orifice of the metering valve, and also to be able to predict the response times of individual injectors to "open" and "close" signals, and also the amount of fuel flowing through each orifice while the injector is changing states. These transient flowrates are affected by the operating voltage of the injector coil and the fuel pressure and temperature. The operating voltage and fuel pressure and temperature are readily obtained using appropriate sensors, while the injector coil temperature may be approximated by a control computer using fuel temperature, valve ambient temperature, injector on time, mass flowrate through the valve, and nominal heat rise and heat transfer characteristics of the injectors.

This information allows the fuel flow during the transient period to be predicted, such that the injectors are opened and closed at the correct times, and for the correct time periods.

The control system includes sensors 22a to detect the vehicle battery voltage (typically between 6 and 24 volts), as the response time of the injector will vary with the coil energising voltage. The control system maintains the energising current at, for example, 2 Amps., which is required to quickly open the injector and due to the low coil impedance assures that the injector will open even when the vehicle battery is operating at unusually low voltages. However, once the injector is open, the energising current is reduced to ½ Amp. This feature, known as current foldback, in this example minimises the generation of heat by the energised coil, prolongs coil life, and reduces the power consumption of the system and most importantly, reduces the time required for the magnetic field in the coil to collapse, which minimises the injector closing period.

While injectors and orifices will be manufactured for specific orifice areas and subsequently specific flowrates, there will still be small production variations in the orifice areas, and thus in the predicted flowrates, when compared to the "perfect" metering valve. To minimise fuelling errors and to avoid discontinuities in the fuel flow, each injector is tested, as mentioned above, such that the characteristics of each individual injector are known and can be introduced into the system control. The testing information may be provided in the form of a bar code, adhered to the injector or metering valve, which bar code may be read when the system is being fitted to a vehicle.

Below are flow figures for an exemplary seven injector, L2S metering valve, for producing a maximum flow of 3000 SCFH.

| Injector Number | All @ -2% | All @ Nominal | All @ +2% | Combinations Min/Max | Random |
|---|---|---|---|---|---|
| 1 | 73.5 | 75 | 76.5 | 76.5 | 73.5 |
| 2 | 73.5 | 75 | 76.5 | 73.5 | 73.5 |
| 3 | 147.0 | 150 | 153.0 | 150 | 146.0 |
| 4 | 294.0 | 300 | 306.0 | 294 | 306.0 |
| 5 | 588.9 | 600 | 612.0 | 612 | 588.0 |
| 6 | 882.0 | 900 | 918.0 | 882 | 918.0 |
| 7 | 882.0 | 900 | 918.0 | 918 | 918.0 |
| Total taking | 2940 | 3000 | 3060 | 3006 | 3023 |

-continued the combinations

|  | Nominal | Min/Max | Random |
|---|---|---|---|
| Output of Injectors 1 + 2 + 3 | 300 | 300 | 293 |
| Output of Injector 4 | 300 | 294 | 306 |
| Error re 1 + 2 + 3 vs 4 | 0 | −2.0% | 4.4% |
| Output of Injectors 1 + 2 + 3 + 5 | 900 | 912 | 881 |
| Output of Injector 6 | 900 | 882 | 918 |
| Error re 1 + 2 + 3 + 5 vs 6 | 0 | −3.3% | 4.2% |

It may be seen that if it was simply assumed that all injectors were nominal, or "perfect" when the metering valve was increasing the flow from, for example 900 SCFH to just over 900 SCFH, when the valve changed from using injectors 1+2+3+5 to using injector 6, there would possibly be an error in fuelling of 3-4%. This might not necessarily noticeably affect the performance of some engines, but for proper operation of, for example, three-way catalytic convertors, it is desirable to have the fuel supply controlled with 0.25%.

To compensate for such errors, one of the pulsing injectors may be used to bridge the gap between the two flow rates. The use of pulsing injectors further provides for greater definition of flow using a limited number of injectors. Clearly, the pulsing cannot be used to provide infinite flow definition, and to provide more accurate prediction of flow a minimum on-time is set for each injector, such that proper control of the valve is maintained and the less predictable pull-in and drop out flowrates have proportionally less effect on the total predicted flow. Typically, for the desired degree of control, a pulsing injector requires a minimum off time of 900 μs and has a pull in time of 1200 μs.

Figure 8:
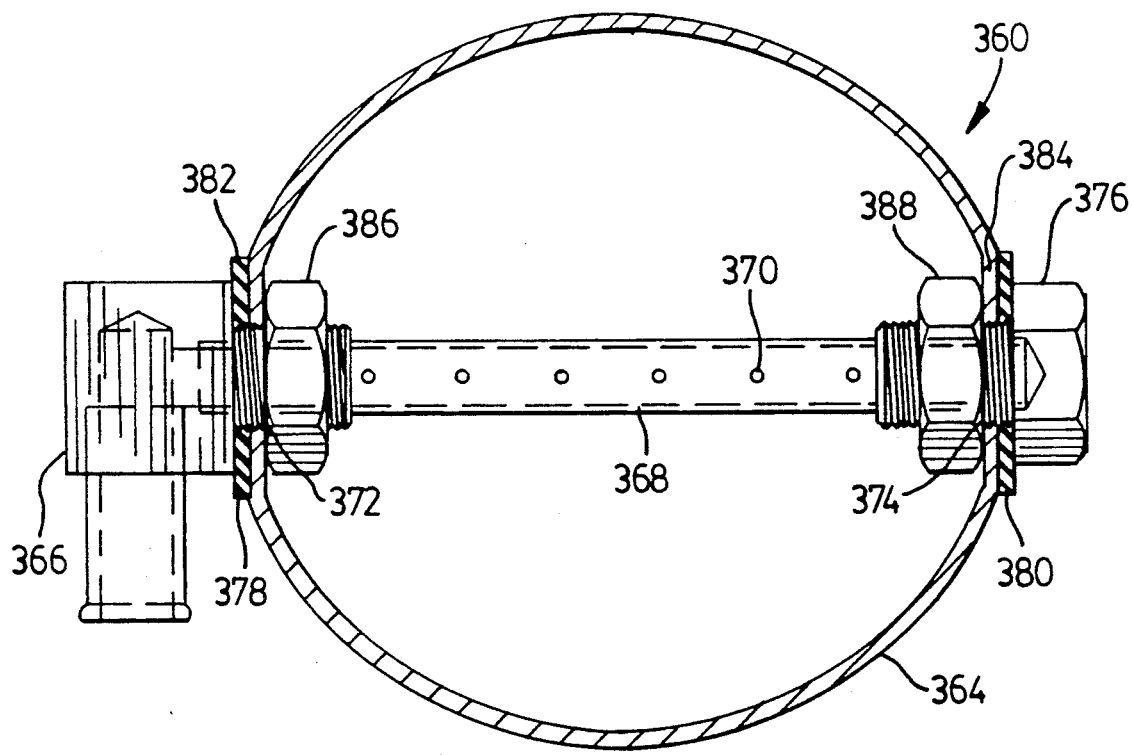
FIG. 8 is a sectional view of an engine air intake showing one example of an air/fuel mixer for use with the fuel supply system of FIG. 1.
Figure 9:
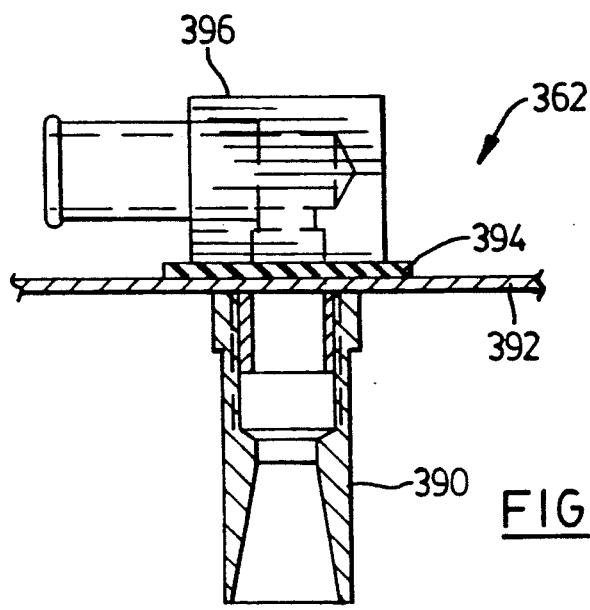
FIG. 9 is a sectional view of an engine air intake showing a further example of an air/fuel mixer, in the form of a nozzle, for use with the fuel supply system of FIG. 1.

Downstream of the metering valve, the metered fuel is mixed with air before being supplied to the engine. The fuel and air are conveniently mixed in or after the engine air cleaner. A fuel mixer 360 and a fuel nozzle 362 suitable for use in this environment is illustrated in FIGS. 8 and 9 of the drawings. Both the fuel mixer 360 and the fuel nozzle 362 are adapted for providing dispersion of the fuel in the air stream. In this system, the fuel is supplied from the metering valve at a positive pressure, preferably at a pressure of between 1 and 2 p.s.i.

FIG. 8 illustrates a mixer 360 suitable for location in the intake air duct 364 between the air cleaner and throttle plate. The nozzle 360 includes a right-angle nozzle inlet 366 for connection to a hose (not shown) leading from the metering valve outlet, the inlet 366 leading into a diffuser tube 368 provided with a series of openings 370 through which the fuel diffuses into the air being drawn into the engine. The ends of the diffuser tube extend through openings 372, 374 in the intake tube 364 and are located, at one end by the nozzle inlet 366, and at the other end by a diffuser tube support 376. Sealing washers 378, 380 are located between the nozzle inlet 366 and tube support 376 and flats 382, 384 formed on the exterior of the intake air duct 364, while retaining nuts 386, 388 are provided on the interior of the duct 364 to hold the tube 368 in the nozzle inlet 366 and support 376.

The nozzle 362 illustrated in FIG. 9 includes a simple diffuser cone 390 fitted to a right angle nozzle inlet 396 and is suited for fitting to an air cleaner, possibly in the air cleaner lid or the inlet snorkel. The illustrated example is shown fitted to an air cleaner lid 392, a sealing washer 394 being provided between the lid and the inlet 396. The cone 390 provides a cone-shaped outlet which diffuses the fuel in the intake air.

When installed in the air-cleaner lid, a nozzle is located over each throttle bore.

The air cleaner lid is the preferred location on direct mounted air cleaners as a means to minimise transient delays and to minimise the volume of "stored" combustible charge above the throttles.

CONTROL OF METERING VALVE

To control the operation of the metering valve to provide the correct quantity of fuel to the engine requires the theoretical modelling of the fuel requirements of the engine, and this is calculated from the calculated mass air flow through the engine. For sonic operation, the mass flow through the injectors of the metering valve has a linear dependency on absolute inlet pressure (assuming temperature constant). Thus the different fuel requirements of different size engines may be broadly accommodated by adjusting the metering valve inlet pressure, using the following equation to assure adequate flow capacity exists.

$$P_{(psig)} = K_R \left[ \frac{P_p}{0.3 \, LHV \, \dot{m}_{max}} (70) + 30 \right] \quad (2)$$

$K_R$ = constant depending on regulator characteristics
$P_p$ = peak engine power [kW]
LHV = lower heating value of fuel [kJ/g]
$\dot{m}_{max}$ = maximum fuel flow capacity at 100 psig [g/s]

This adjustment is achieved by adjustment of the pressure regulator. As mentioned above, an engine s instantaneous fuel flowrates are calculated based on the mass air flow to the engine. The mass air flow (MAF) is calculated as follows:

$$MAF = \frac{K \cdot n_{air} \, D \cdot RPM \cdot MAP \cdot (1 - EGR) \cdot \eta_{vol}}{(T_{mix})} \quad (3)$$

Where
K = conversion constant
$n_{air}$ = air portion of intake charge
D = engine displacement (liters)
RPM = engine speed (rev./min.)
MAP = manifold absolute pressure ("Hg)
$\eta_{vol}$ = volumetric efficiency, function of MAP, RPM
$T_{mix}$ = air charge obsolute temperature near intake valve (° K)
λ = mass air/fuel ratio As can be seen above, equation (3) includes the volumetric efficiency ($\eta_{vol}$) as a function of MAP and RPM. One implementation of the control programme for the system includes a universal 208-point volumetric efficiency table (16 RPM cells × 13 MAP cells). An acceptable choice for the points are:

MAP : 29.6, 27.5, 25.6, 23.3, 21.2, 19.2, 17.5, 15.9, 14.5, 13.1, 11.7, 9.9, 7,.4

R.P.M. : I, $I(T/I)^{2/9}$, ... $I(T/I)^{8/9}$, T, $T(P/T)^{\frac{1}{3}}$, $T(P/T)^{\frac{2}{3}}$, P, 1.15.P, $(1.15)^2$.P where:
 = peak power RPM
T = peak torque RPM
I = idle RPM Volumetric efficiency can be empirically determined on each engine. Alternatively, a mathematical model may be used to develop the volumetric efficiency of each engine. The overall volumetric efficiency is defined as the actual mass of fresh air which passes into an engine cylinder during one intake stroke divided by the ideal air mass ($M_{air}$) which would fill the piston displacement under the same conditions.

for a 4-stroke engine:
$$\eta_{vol} = (2 \cdot MAF \cdot 60)/D \cdot S \cdot RPM) \quad (5)$$
a. for engine speeds > peak torque:

$$(RPM, MAP) = \eta_{peak} \cdot \quad (6)$$

$$\left[ 0.281 + \frac{\epsilon - P_e/P_i}{1.39 \cdot (\epsilon - 1)} \right]\left[ I - R \cdot \left(1 - \frac{RPM}{RPM_{P.T.}}\right)^2 \right]$$

b. for engine speeds $\leq$ peak torque:

$$(RPM, MAP) = \eta_{peak} \cdot \quad (7)$$

$$\left[ 0.281 + \frac{\epsilon - P_e/P_i}{1.39 \cdot (\epsilon - 1)} \right]\left[ I - S \cdot \left(1 - \frac{RPM}{RPM_{P.T.}}\right)^2 \right]$$

with Pressure ratio $$\frac{P_e}{P_i} = \frac{C}{MAP} \cdot$$

$$\left[ a_0 + a_1 \cdot \left( \frac{MAP}{MAP_{max}} \right) + a_2 \cdot \left( \frac{MAP}{MAP_{max}} \right)^2 \right].$$

$$\left[ b_0 + b_1 \cdot \left( \frac{RPM}{RPM_{p.p.}} \right) + b_2 \cdot \left( \frac{RPM}{RPM_{p.p.}} \right)^2 \right]$$

where
$\eta peak$ = estimated peak volumetric efficiency
$\epsilon$ = compression ration
$RPM_{P.T.}$ = engine speed at peak torque (rev./min.)
$R.P.M._{p.p.}$ = engine speed at peak torque $$R = \frac{(1 - C)}{\left(1 - \frac{RPM_{pp}}{RPM_{PT}}\right)^2}$$

$$C = \frac{\left(\frac{4000 \cdot T_p}{D} + FMEP_p\right)}{\left(\frac{4000 \cdot T_T}{D} + FMEP_T\right)}$$

$$FMEP = \left[ c_0 + c_1 \cdot \frac{D \cdot RPM}{z \cdot b^2} + c_2 \cdot \left(\frac{D \cdot RPM}{z \cdot b^2}\right)^2 \right]$$

$$S = \frac{(1 - \eta_i)}{\left(1 - \frac{RPM_i}{RPM_{PT}}\right)^2}$$

$$\eta_i = (1 - \eta_m) \cdot \left(\frac{RPM_{PT}}{RPM_i}\right) \cdot$$

$$\left[ 1 - 15\left(\frac{1}{RPM_i} - \frac{1}{RPM_{pt}}\right)\right] \cdot \sqrt{\frac{T_c}{T_b}}$$

$a_0, a_1, a_2, b_0, b_1, b_2, c_0, c_1, c_2$ = empirical constants
$RPM_i$ = engine speed at idle (rev./min.)
$\eta_m$ = mechanical efficiency
$T_c$ = thermostat opening temperature [K]
$T_b$ = base temperature [K]
$z$ = number of cylinders
$b$ = cylinder bore [mm]

As the estimation of peak volumetric efficiency $\eta peak$) for each engine is somewhat cumbersome and it has been found that $\eta peak = 0.85$ is a reasonable approximation for the majority of naturally aspirated spark ignition (S.I.) engines. However, the figure is typically higher when tuned intake or exhaust manifolds are used, or when an engine is turbocharged or supercharged. Appropriate values must be calculated or approximated for these less common configurations.

As noted from equation (3), mass flow determination requires measurement of air temperature near the intake valve ($T_{mix}$). For existing vehicles, the inconvenience of an aftermarket installation of a temperature sensor near the intake valve requires the prediction of the air charge temperature increase from the air temperature sensor location, typically in the air cleaner to the intake valve.

The modelling of the mixture temperature $(T_{mix})° K$ near the intake valve involves calculation using calibrated and measured data:

$$T_{mix} = T_s -$$

$$\left(T_s - (T_s - T_{ia}) * exp\left\{\frac{K_1 * Z^{0.6} * L}{(RPM_{pp} * D)^{0.4} * (MAF)^{0.2}}\right\}\right) + T_{uni}$$

$$T_{ia} = \frac{1.007(A)(LAMBDA)(T_{air}) + 2.23(T_{fuel})}{1.007(A)(LAMBDA) + 2.23}$$

$$T_{uni} = \frac{K_2 \cdot (RPM_{pp}) \cdot (D)}{MAF} \text{ for unisided heads}$$

$$= O \text{ for crossflow heads or v-type manifolds}$$

Figure 10:
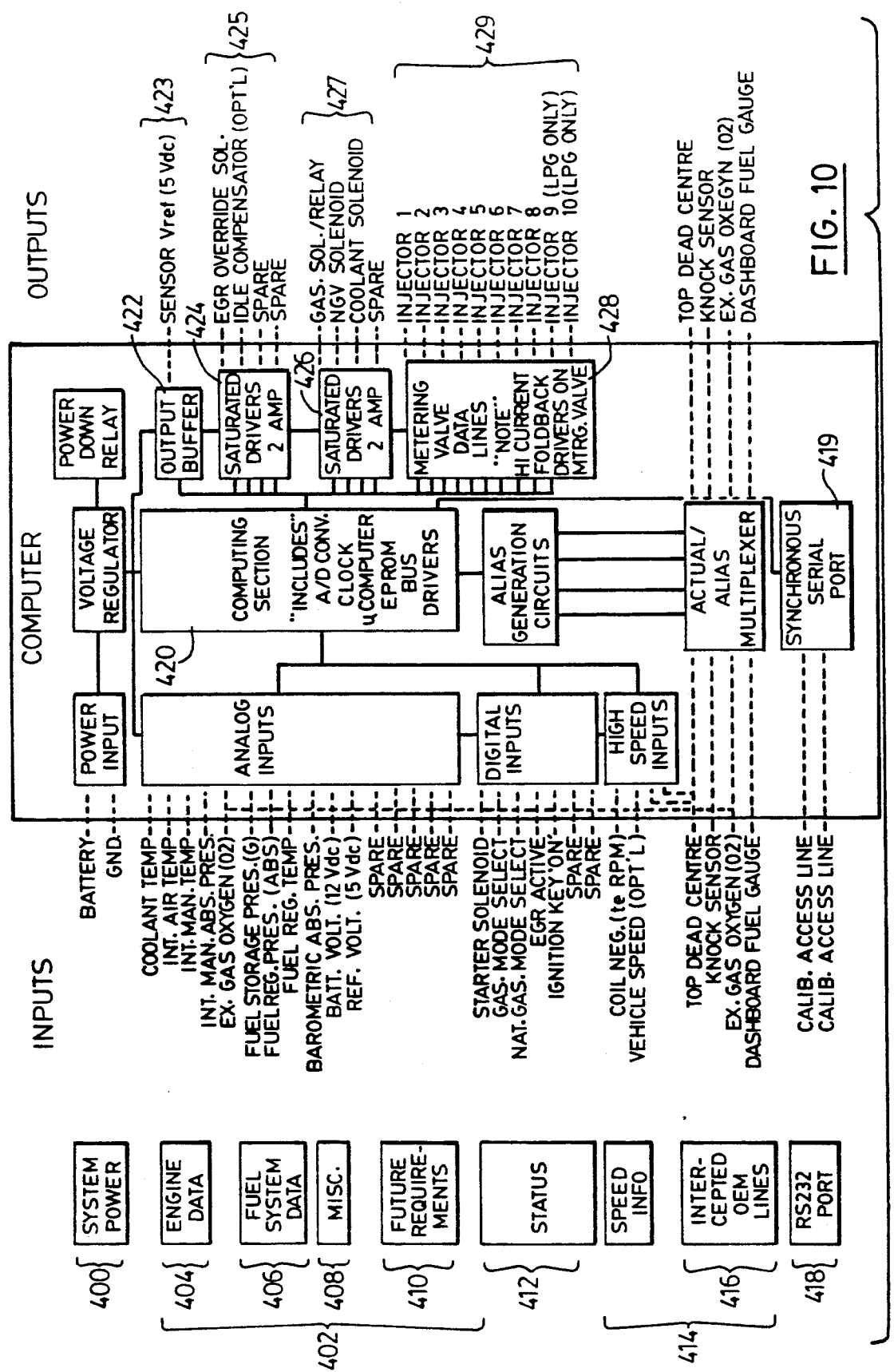
FIG. 10 is a block view of the controller of the supply system of FIG. 1.

$T_{air}$ = air inlet temperature [K]
$T_{fuel}$ = fuel temperature [K]
$Z$ = ∩ of cylinders
$L$ = intake runner length [m]
$RPM_{pp}$ = engine speed at peak power [RPM]
$D$ = engine displacement [liter]
$A$ = stoichiometric air/fuel ratio
LAMBDA = nominal excess air ratio; for real time metering
MAF = mass air flow [g/s](calculated using equation (1) with $T_{mix} = T_{air}$)
$K_1, K_2$ = empirically determined constants FIG. 10 is a block diagram of a suitable computer and sensor set up for controlling the metering valve to provide desired fuel flows, as described above, and illustrates the various sensors which are utilised to determine the settings of the metering valve.

The system power inputs 400 include an input from the battery and a ground line. The analog inputs 402 include engine data 404, fuel system data 406, miscellaneous data 408 and a number of spare lines for future requirements 410. The engine data 404 includes engine coolant temperature, intake air temperature, intake manifold absolute pressure, and exhaust gas oxygen. The fuel system data includes fuel storage pressure (gauge), fuel regulated pressure (absolute) and fuel regulated temperature. The miscellaneous inputs include barometric pressure, battery voltage and a reference voltage (5 volts dc).

The analog inputs are converted to digital signals for processing.

The digital inputs 412 relate primarily to status, and include inputs from the starter solenoid, gasoline mode select, natural gas or propane mode select, the exhaust gas recirculator (EGR), and ignition key.

Inputs 414 relating to engine speed are classified as high speed inputs, and comprise the coil negative, that is the engine R.P.M., and possibly also an input relative to actual vehicle speed. In this particular example, for use in fitting to a conventional gasoline fuelled vehicle a number of high speed inputs may also be obtained by intercepting the original engine manufacturer's (OEMs) data lines 416, such as the top dead centre sensor, the knock sensor and exhaust gas oxygen sensor.

An input may also be provided from the vehicle dashboard fuel gauge.

Calibration inputs 418 are provided for communication with a synchronous serial port 419 for use in calibration of the sensors for detecting top dead centre, knock, exhaust gas oxygen and the dashboard fuel gauge.

The inputs are fed to the computing section 420 which includes an analogue to digital converter (for the analogue inputs), a clock, a microprocessor, an EPROM, bus drivers, and battery (for back-up power).

An output from the computing section 420 passes through an output buffer 422 to provide the reference voltage output 423.

Other outputs from the computing section pass through saturated 1 Amp drivers 424 to an EGR override solenoid and an optional idle compensator outputs 425.

2 Amp drivers 426 are also provided for outputs 427 for control of a gasoline solenoid or relay, for twin-fuelled vehicles, the solenoid in the pressure regulator, and a coolant supply solenoid.

A plurality of metering valve data lines 428 are also provided, one line for each solenoid of the valve. For a typical natural gas application approximately seven or eight outputs 429 will be provided, and on propane or LPG applications nine or ten injectors and outputs may be required. As mentioned above with reference to FIG. 5d, due to the heat they produce, the hi-current foldback drivers are located in the metering valve body.

CLOSED LOOP SYSTEM

To further compensate for fuelling errors, an active oxygen sensor feedback system and a keep alive adapted memory are included in the control system.

Fuelling errors may be caused by various deviations, including:
sensor deviation from the respective calibration curve
inaccuracy of metering valve calibration curve
deviation of actual vs. calculated volumetric efficiency
deviation of actual vs. calculated air charge temperature near intake valve
deviation of actual vs. calculated fuel demand
changes in natural gas composition In order to assist the oxygen sensor in quickly finding stoichiometry, an adaptive memory strategy is provided and structured in a similar manner as the volumetric efficiency table, that is, a table provided with cells, for example 16 RPM cells × 13 MAP cells, each cell holding a value for a volumetric efficiency correction matrix, VC (RPM,MAP).

Initially, the table holds values of VC=1, and as the vehicle is operated within closed loop within a cell, the particular value of VC (RPM, MAP) is altered until stoichiometry is reached. The table holds the altered values and can thereafter reach stoichiometry more quickly, as the starting value is likely to be closer to the desired value.

As a further refinement, a series of separate VC (RPM, MAP) factors could be created and stored in the computers memory, to uniquely compensate for metering errors identified by the closed loop during readily identifiable distinct operating modes such as for EGR active, EGR inactive, air temperature within specific limits, barometric pressure within specific limits, rate of change of engine speed greater than a specific value, MAP value less than minimum standard point by more than a specific value, and the value in the standard matrix.

The above described embodiment has been described with reference to sonic flow through the orifices of the metering valve. It is also possible to operate the system using sub-sonic flow, though this complicates control as the outlet pressure in the metering valve must be taken into account in order to calculate the mass flow rate through each orifice. Sub-sonic flow may be considered in circumstances where the fuel, typically propane, will be operating at or below the critical pressure for the orifice geometry used (that is, the sonic pressure ratio could not predictably be maintained across the orifice). In propane systems this would be most likely to occur at temperatures below −20° C. where there was inadequate heat from the engine and/or environment to vaporize the fuel and maintain it at a sufficiently high pressure.

Reference has primarily been made to spark ignition engines, though the system may also have utility in conversion of compression ignition or diesel engines. Typically natural gas will not ignite due to compression at compression ratios below 20:1, such that an ignition using either pilot injected diesel fuel, or a separate spark plug arrangement will be necessary. Nonetheless, the system described herein is viable to such applications.

Further, while the above described embodiments are adapted for use with internal combustion engines, it is of course possible that the system, and the components thereof, could be adapted for use in other applications.

We claim:

1. Apparatus for controlling the rate of flow of a fluid from a common inlet to a common outlet comprising:
   (a) a plurality of fluid conducting lines having a plurality of flow capacities, said plurality of lines being connected in parallel between said common inlet and said common outlet such that the total flow from said common inlet to said common outlet is equal to the sum of the separate flows through the individual lines;
   (b) a pulsing fluid control valve in each of at least two of said lines, and a bi-stable fluid control valve in each of the remaining lines;
   (c) sensors for measuring parameters of the fluid sufficient to determine the potential mass flow of said measured fluid through each control valve when open;
   (d) control means adapted to control selectively the opening and closing of said control valves and monitor the sensors to determine the potential mass flow through each control valve in accordance with the measured fluid parameters, the total fluid flow passing outwardly of said common outlet comprising abase flow component established by opening selected control valves to provide a continuous predetermined flow, discrete step changes in the base flow component being provided by opening and closing combinations of control valve, increments of fluid flow between said discrete steps being provided by opening at least one predetermined pulsing valve for a fraction of a predetermined time period to provide a desired average flow over said time period.

2. The apparatus of claim 1, wherein the sum of the flowrates through the two lines having the lowest flow capacities is greater than the flowrate through the line having the third lowest flow capacity.

3. The apparatus of claim 2, wherein the flowrate capacities of the two fluid conducting lines having the lowest flow capacities are substantially equal.

4. The apparatus of claim 1, wherein there are two pulsing control valves which may be opened for a fraction of said predetermined time period and which are located in the two fluid conducting lines having the lowest flow capacities.

5. The apparatus of claim 1 further comprising a metering orifice in each of said fluid conducting lines.

6. The apparatus of claim 5, including means ensuring that the pressure difference between the common inlet and the common outlet is maintained at a level sufficient to provide sonic flow through the orifices in each fluid conducting lines.

7. The apparatus of claim 6, wherein the control valves are electrically operated solenoid valves.

8. The apparatus of claim 6, wherein the sensors detect at least the temperature and pressure of the fluid.

9. The apparatus of claim 1, wherein the fluid is fuel for an internal combustion engine and the control means operate the control valves to provide a supply of fuel in accordance with selected engine parameters.

10. The apparatus of claim 9, adapted for supplying fuel for an internal combustion engine, wherein the engine operates on one of spark ignition or compression ignition, and said predetermined time period is the time between combustion events.

11. The apparatus of claim 1, wherein the control means is adapted to determine the required fuel flow of the engine based on various parameters, the required fuel flow being proportional to the volumetric efficiency of the engine as a function of engine manifold absolute pressure and engine speed, the control means including a look-up table containing a plurality of cells corresponding to preselected ranges of engine manifold absolute pressures and engine speeds.

12. The apparatus of claim 11, and further including a pressurized fuel container and a fuel pressure regulator for supplying fuel from the pressurized fuel container at said first pressure to said common inlet.

13. The apparatus of claim 12, wherein the metered supply of fuel is mixed with the intake air of the engine, a diffuser cone being provided in fluid communication with the common outlet and located in the engine air intake.

14. The apparatus of claim 1, wherein the flow capacities of the two fluid conducting lines having the highest flow capacities are substantially equal to twice the flow capacity of the next lowest flow capacity fluid conducting line.

15. The apparatus of claim 1, wherein the flow capacities of the two fluid conducting lines having the highest flow capacities are substantially equal to the sum of the flow capacities of the two next lowest capacity fluid conducting lines, one of said two next lowest capacity fluid conducting lines having a flow capacity twice that of the other fluid conducting line.

16. The apparatus of claim 1, wherein said flow capacities of said fluid conducting lines are related to one another as to be proportional to respective ones of a plurality of preselected numerical values, said preselected numerical values following the series $2^0$, $2^0$, $2^1$, $2^2$, ..., $2^{n-2}$ and $2^{n-1}$, where there are $n+1$ fluid conducting lines.

17. The apparatus of claim 1, wherein said flow capacities of said fluid conducting lines are related to one another as to be proportional to respective ones of a plurality of preselected numerical values, said preselected numerical values following the series $2^0$, $1^0$, $2^1$, $2^2$, ..., $2^{n-1}$ and $2^{n-2}$, where there are $n+1$ fluid conducting lines.

18. The apparatus of claim 1, wherein said flow capacities of said fluid conducting lines are related to one another as to be proportional to respective ones of a plurality of preselected numerical values, said preselected numerical values following the series $2^0$, $2^0$, $2^1$, $2^2$, ..., $2^{n-4}$ and $2^{n-3}$, $(2^{n-4}+2^{n-3})$ and $(2^{n-4}+2^{n-3})$ where there are $n+1$ fluid conducting lines.

19. A method for controlling the rate of flow of a compressible fluid between a common inlet at a first pressure and a common outlet at a lower second pressure through a plurality of parallel fluid conducting lines adapted to provide a plurality of flowrates therethrough and each fluid conducting line being provided with a fluid flow control valve, at least two of said valves being pulsing valves, the remaining valves being bi-stable valves, comprising controlling selectively the opening and closing of said control valves to control the fluid flow passing outwardly of said common inlet by providing a base flow component established by opening selected bi-stable control valves to provide a continuous predetermined flow, discrete step changes in the base flow component being provided by opening and closing combinations of bi-stable control valves, increments of fluid flow between said discrete steps being provided by opening at least one pulsing valve for a fraction of a predetermined time period to provide a desired average flow over said predetermined time period.

20. The method of claim 19, wherein the compressible fluid is fuel for supply to an internal combustion engine and said predetermined time period is the time between combustion events.

21. The method of claim 19, wherein the minimum open time of said pulsing valve for one predetermined time period is the time taken for the valve to open and the maximum open time of said valve for one predetermined time period is the predetermined time period less the time for the valve to close.

22. The method of claim 19, further including determining the response time of individual control valves to open and close commands, determining the flow through the liens while the control valves are changing states, and timing the opening and closing of said control valves to provide said desired discrete step changes in said base flow component.

23. A fluid metering device for use in a gaseous fuel injection system for an internal combustion engine comprising:

(a) a body defining an inlet fluid manifold and a metered fluid manifold;

(b) a fluid inlet for introducing fluid into the inlet fluid manifold;

(c) a plurality of bi-stable fluid flow control valves for communication between the inlet fluid manifold and the metered fluid manifold, each valve including an orifice and a movable plunger for closing the orifice, the orifice of each valve being between the converging portion and the diverging portion of a nozzle, (d) valve actuators for opening and closing the valves;

(e) a fluid outlet for passage of metered fluid from the metered fluid manifold;

(f) sensors provided in communication with the inlet fluid manifold to determine parameters of the inlet fluid and the metered fluid sufficient to determine the potential mass flow of fluid through each of the valves;

(g) valve control means for activating the valve actuators to open the valves in combinations and for time intervals to give a desired total mass flow of fluid through the valves; and (h) a heating fluid passage extending through the body for heating the body to compensate, in part at least, for the cooling of the fluid which takes place on expansion of the fluid passing through the valve orifices, said heating fluid passage being formed of a plurality of intersecting bores, control means being provided for controlling the flow of heating fluid through the heating passage, said control means including a solenoid-operated valve provided in an inlet of the passage.

24. The fluid metering device of claim 23, wherein the fluid metering device forms part of a system for controlling the flow of fuel to an internal combustion engine including a liquid cooling system, the heating fluid passage of the metering device being in communication with the liquid cooling system of the engine.

* * * * *